US012784685B2

(12) United States Patent
Lee et al.

(10) Patent No.: US 12,784,685 B2
(45) Date of Patent: Nov. 3, 2026

(54) PIXEL CIRCUIT AND DISPLAY APPARATUS COMPRISING THE SAME

(71) Applicant: LG Display Co., Ltd., Seoul (KR)

(72) Inventors: Hyun Soo Lee, Paju-si (KR); Seo Jun Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/283,638

(22) Filed: Jul. 29, 2025

(65) Prior Publication Data

US 2026/0073867 A1 Mar. 12, 2026

(30) Foreign Application Priority Data

Sep. 6, 2024 (KR) ........................ 10-2024-0121279

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ......... G09G 3/3233; G09G 2300/0819; G09G 2300/0852; G09G 2310/08; G09G 2300/061; G09G 2320/0233
See application file for complete search history.

(56) References Cited

U.S. PATENT DOCUMENTS

| | | | | |
|---|---|---|---|---|
| 12,307,962 B2 | 5/2025 | Kim et al. | | |
| 2024/0038159 A1* | 2/2024 | Lin | ...................... | G09G 3/3225 |
| 2025/0252915 A1* | 8/2025 | Park | ..................... | G09G 3/3233 |

FOREIGN PATENT DOCUMENTS

| | | | |
|---|---|---|---|
| KR | 20210082602 A | 7/2021 | |
| KR | 20230034821 A | 3/2023 | |
| KR | 20230038351 A | 3/2023 | |
| WO | WO-2023016138 A1 * | 2/2023 | ........... G09G 3/3677 |

* cited by examiner

*Primary Examiner* — Lixi C Simpson
(74) *Attorney, Agent, or Firm* — Seed Intellectual Property Law Group LLP

(57) ABSTRACT

Disclosed is a pixel circuit and a display apparatus having the same. The pixel circuit includes a first node connected to a VDD line to which a first constant voltage is applied; a third node connected to a fourth node connected to a light-emitting element; a fourth-first switch element arranged between the VDD line and the first node; and a fourth-second switch element arranged between the VDD line and the first node. An initialization phase, a sampling phase, an addressing phase, and an emission phase during a driving step are repeatedly performed. The fourth-first switch element and the fourth-second switch element are PWM-driven in the emission phase. With this configuration, a display apparatus with improved Mura may be provided.

20 Claims, 36 Drawing Sheets

PIXEL CIRCUIT AND DISPLAY APPARATUS COMPRISING THE SAME

CROSS-REFERENCE TO RELATED APPLICATION

This application claims priority to and the benefit of Korean Patent Application No. 10-2024-0121279, filed Sep. 6, 2024, the disclosure of which is incorporated herein by reference in its entirety.

BACKGROUND

Technical Field

The present specification relates to a pixel circuit and a display apparatus including the same.

Description of the Related Art

Electroluminescent displays are roughly classified into inorganic light-emitting display apparatuses and organic light-emitting display apparatuses depending on the material of the emission layer. An active matrix type organic light-emitting display apparatus includes an organic light-emitting diode (hereinafter referred to as "OLED") which emits light by itself and has the advantages of fast response speed and large luminous efficiency, luminance, and viewing angle. In the organic light-emitting display apparatus, the organic light-emitting diode (OLED) is formed on each of pixels. The organic light-emitting display apparatus has a fast response speed and excellent luminous efficiency, luminance, and viewing angle, and has an excellent contrast ratio and color reproducibility as it can express black gray scales in full black.

In the case of the organic light-emitting display apparatuses, the image is displayed based on the light generated from the light-emitting elements within the pixel, which has various advantages, but when driving, the mura such as a stain occurs due to the coupling between the wires inside the pixel or the operating conditions of the driving signal, and resulting in uniformity defects. This may be a factor that reduces the satisfaction of the image quality of the display apparatus.

BRIEF SUMMARY

The present specification addresses, among others, some problems in the prior art.

The features of the present specification are not limited to the those specifically described herein, and additional features, which are not mentioned herein, will be obvious to those skilled in the art from the following description.

A pixel circuit according to an embodiment of the present specification may include a first node connected to a VDD line to which a first constant voltage is applied, a third node connected to a fourth node connected to a light-emitting element, a fourth-first switch element arranged between the VDD line and the first node, and a fourth-second switch element arranged between the VDD line and the first node, wherein an initialization phase, a sampling phase, an addressing phase, and an emission phase are repeatedly performed in a driving step, and the fourth-first switch element and the fourth-second switch element may be PWM-driven in the emission phase.

According to various embodiments of the present specification, the emission phase may include a first emission phase in which a first-first EM pulse including a gate-on voltage and a first-second EM pulse including only a gate-off voltage are applied, and a second emission phase in which the first-second EM pulse including a gate-on voltage and the first-first EM pulse including only a gate-off voltage are applied.

According to various embodiments of the present specification, the first-first EM pulse may be applied to a gate electrode of the fourth-first switch element, and the first-second EM pulse may be applied to a gate electrode of the fourth-second switch element.

According to various embodiments of the present specification, the emission phase may be performed by alternately repeating the first emission phase and the second emission phase.

According to various embodiments of the present specification, the fourth-first switch element may include a gate electrode to which the first-first EM pulse is applied, a first electrode connected to the VDD line, and a second electrode connected to the first node, and the fourth-second switch element may include a gate electrode to which the first-second EM pulse is applied, a first electrode connected to the VDD line, and a second electrode connected to the first node.

According to various embodiments of the present specification, the emission phase may be performed by alternately repeating the first emission phase and the second emission phase, and the first-first EM pulse may include a gate-on voltage and a gate-off voltage in the first emission phase, and may include a gate-off voltage in the second emission phase.

According to various embodiments of the present specification, the emission phase may be performed by alternately repeating the first emission phase and the second emission phase, and the first-second EM pulse may include a gate-off voltage in the first emission phase and a gate-on voltage and a gate-off voltage in the second emission phase.

According to various embodiments of the present specification, in an interval in which the first-first EM pulse is at a gate-on voltage, the first-second EM pulse may be at a gate-off voltage, and in an interval in which the first-second EM pulse is a gate-on voltage, the first-first EM pulse may be at a gate-off voltage.

According to various embodiments of the present specification, in an interval in which the first-first EM pulse is at a gate-off voltage, the first-second EM pulse may include an interval which is a gate-on voltage and an interval which is at a gate-off voltage, and in an interval in which the first-second EM pulse is at a gate-off voltage, the first-first EM pulse may include an interval which is at a gate-on voltage and an interval which is a gate-off voltage.

According to various embodiments of the present specification, the first constant voltage may be a pixel driving voltage.

A display apparatus according to an embodiment of the present specification may include a display panel in which a plurality of data lines, a plurality of gate lines intersecting the data lines, a plurality of power lines, and a plurality of pixel circuits connected to the data lines, the gate lines, and the power lines are arranged; a data driver configured to supply a data voltage of pixel data to the data lines; and a gate driver configured to supply a gate signal to the gate lines, wherein each of the plurality of pixel circuits may include: a first node connected to a VDD line to which a first constant voltage is applied; a third node connected to a fourth node connected to a light-emitting element, a fourth-first switch element arranged between the VDD line and the first node; and a fourth-second switch element arranged between the VDD line and the first node, and wherein the pixel circuit repeatedly may perform an initialization phase, a sampling phase, an addressing phase, and a emission phase in a driving phase, and the fourth-first switch element and the fourth-second switch element may be PWM-driven in the emission phase.

According to various embodiments of the present specification, the display panel may include: a plurality of pixel lines, each of the plurality of pixel lines may include a plurality of pixels, each of the plurality of pixels may include the pixel circuit, and each of the plurality of pixel lines may share one gate line of the gate lines.

According to various embodiments of the present specification, in the driving phase, an emission phase may be performed on one pixel line among the plurality of pixel lines, and a sampling phase may be performed on another pixel line among the plurality of pixel lines.

According to various embodiments of the present specification, each of the plurality of pixel circuits may further include: a driving element including a gate electrode connected to a second node, a first electrode connected to the first node, and a second electrode connected to a third node.

According to various embodiments of the present specification, each of the plurality of pixel circuits may further include: a third switch element including a gate electrode, a first electrode connected to the fourth node, and a second electrode to which a third constant voltage is applied.

According to various embodiments of the present specification, each of the plurality of pixel circuits may further include: a first switch element including a gate electrode connected to a first gate line to which the first scan pulse is applied, a first electrode connected to a data line to which a data voltage is applied; and a second electrode connected to the second node, and a second switch element including a gate electrode connected to a second gate line to which a second scan pulse is applied, a first electrode connected to a REF line to which a second constant voltage is applied, and a second electrode connected to the second node.

According to various embodiments of the present specification, each of the plurality of pixel circuits may further include: a second capacitor connected between the third node and the VDD line.

According to various embodiments of the present specification, each of the plurality of pixel circuits may further include: a fifth switch element including a gate electrode connected to a fifth gate line to which a second EM pulse is applied, a first electrode connected to the third node, and a second electrode connected to the fourth node, wherein the gate electrode of the third switch element may be connected to a third gate line to which a third scan pulse is applied.

According to various embodiments of the present specification, each of the plurality of pixel circuits may further include: a first switch element including a gate electrode connected to a first gate line to which a first scan pulse is applied, a first electrode connected to the third node, and a second electrode connected to a data line to which a data voltage is applied; and a second switch element including a gate electrode connected to a second gate line to which a second scan pulse is applied, a first electrode connected to the second node, and a second electrode connected to the first node.

According to various embodiments of the present specification, each of the plurality of pixel circuits further includes: a fifth switch element including a gate electrode connected to a fifth gate line to which a second EM pulse is applied, a first electrode connected to the third node, and a second electrode connected to the fourth node, wherein a gate electrode of the third switch element may be connected to the fifth gate line.

According to the present specification, it is possible to reduce the deviation of the number of gate-off voltages without changing the luminance of the pixel.

According to the present specification, a change in the pixel driving voltage to be supplied during the sampling phase may be prevented.

According to the present specification, the display apparatus may be provided with the improved mura.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
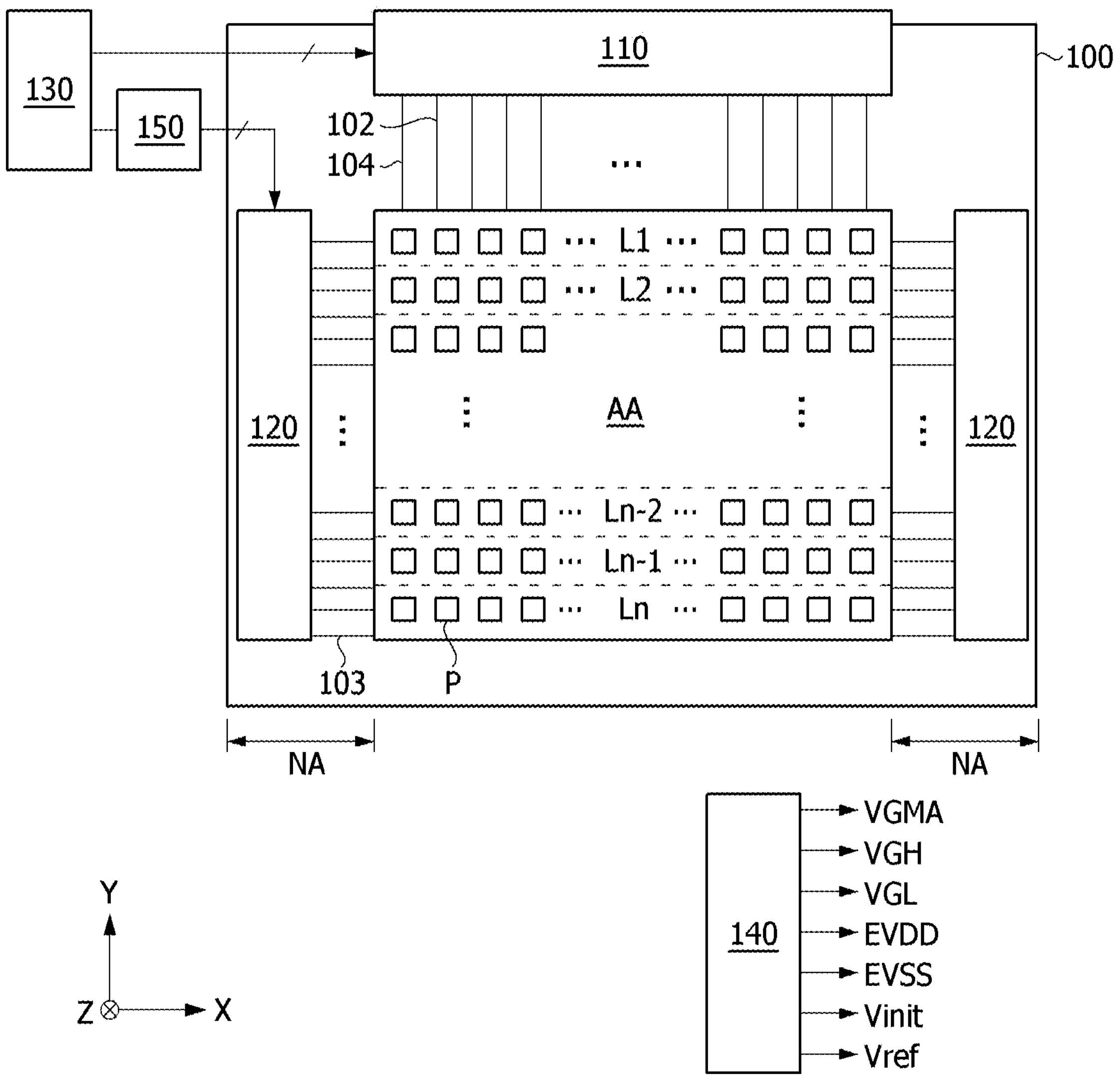
FIG. 1 is a block diagram illustrating a display apparatus according to an embodiment of the present specification.

The advantages and features disclosed herein and methods for accomplishing the same will be more clearly understood from embodiments described below with reference to the accompanying drawings. The present disclosure is not limited to the following embodiments, which may be implemented in various different forms; rather, the present embodiments are provided to make the disclosure of the present disclosure complete and to allow those skilled in the art to fully understand the scope of the present disclosure.

In describing the present disclosure, detailed descriptions of known related technologies may be omitted so as not to unnecessarily obscure the subject matter of the present disclosure.

The terms such as "comprising," "including," "having," and "consisting of" used herein are generally intended to allow other components to be added unless the terms are used with the term "only." References to the singular shall be construed to include the plural unless expressly stated otherwise.

When describing a positional or interconnected relationship between two components, such as "on top of," "above," "below," "next to," "connecting or coupling," "crossing," "intersecting," etc., one or more other components may be interposed between them unless "immediately" or "directly" is used.

When describing a temporal contextual relationship is described, such as "after," "following," "next to," or "before," it may not be continuous on a time scale unless "immediately" or "directly" is used.

The first, second, and so on may be used to distinguish the components, but the functions or structures of these components are not limited to the ordinal number or component name attached to the component.

The following embodiments may be combined or associated with each other in whole or in part, and various types of interlocking and driving are technically possible. The embodiments may be implemented independently of one another or may be implemented together in an interrelated relationship.

Terms used in the embodiments of the specification (including technical and scientific terms) are to be construed as they would be commonly understood by one of ordinary skill in the art to which the disclosure belongs, unless otherwise specifically defined and described, and commonly used terms, such as dictionary defined terms, are to be construed in light of their contextual meaning in the relevant art.

In a display apparatus of the present specification, the pixel circuit and the gate driving circuit may include a plurality of transistors. The transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, the carriers start to flow from the source. The drain is an electrode through which the carriers exit in the transistor. In the transistor, the carriers flow from the source to the drain.

In the case of an n-channel transistor, since the carriers are electrons, a source voltage is lower than a drain voltage, allowing the electrons to flow from the source to the drain. In the n-channel transistor, the direction of current is from the drain to the source. In the case of a p-channel transistor, since the carriers are holes, a source voltage is higher than a drain voltage such that the holes can flow from the source to the drain. In the p-channel transistor, the current flows from the source to the drain because the holes flow from the source to the drain. It should be noted that the source and the drain of the transistor are not fixed. For example, the source and the drain may be changed according to an applied voltage. Therefore, the present disclosure is not limited by the source and the drain of the transistor. In the following description, the source and the drain of a transistor will be referred to as a first electrode and a second electrode.

A gate signal may swing between a gate-on voltage and a gate-off voltage. The transistor may be turned on in response to the gate-on voltage, whereas it may be turned off in response to the gate-off voltage. In the case of the n-channel transistor, the gate-on voltage may be a gate high voltage VGH, and the gate-off voltage may be a gate low voltage VGL. In case of the p-channel transistor, the gate-on voltage may be the gate low voltage VGL, and the gate-off voltage may be the gate high voltage VGH.

Hereinafter, embodiments of the present specification will be described in detail with reference to the accompanying drawings.

FIG. 1 is a block diagram illustrating a display apparatus according to an embodiment of the present specification.

Referring to FIG. 1, a display apparatus of one embodiment of the present specification may be an organic light-emitting display apparatus. This display apparatus includes a display panel 100, display panel driving circuits 110 and 120 for writing image data to pixels of the display panel 100, and power circuit 140 for generating power necessary for driving the pixels and the display panel driving circuits 110 and 120. The display panel driving circuits 110 and 120 and the power circuit 140 may be a display panel driver that drives the display panel.

The display panel 100 may be a panel having a rectangular structure with a length in the X-axis direction, a width in the Y-axis direction, and a thickness in the Z-axis direction.

A display area AA of the display panel 100 may include a pixel array for displaying images thereon. The pixel array may include a plurality of data lines 102, a plurality of gate lines 103 intersected with the plurality of data lines 102, a plurality of sensing lines 104, and pixels P arranged in a matrix form. The display panel 100 may further include a plurality of power lines commonly connected to the pixels P. The power lines may be connected to the pixels P and supply constant voltages required for driving the pixels P to the pixels P. The pixels P includes a plurality of pixel circuits connected to the data lines 102, the gate lines 103, and the power lines.

The pixels P may be divided into two or more sub-pixels for color implementation. For example, three pixels, which are arranged sequentially along the X-axis direction, may be divided into a red sub-pixel, a green sub-pixel, and a blue sub-pixel. Further, four pixels, which are arranged sequentially along the X-axis direction, may be divided into a red sub-pixel, a green sub-pixel, a blue sub-pixel, and a white sub-pixel.

Each of the pixels P may be connected to the data line, the gate lines, and the power lines.

The pixel array may include a plurality of pixel lines L1 to Ln. Each of the pixel lines L1 to Ln may include a plurality of the pixels P arranged along the line direction (X-axis direction) in the pixel array of the display panel 100. Each of the pixels arranged in one pixel line may share one of the gate lines 103. The pixels P arranged in a column direction (Y-axis direction) along the direction of the data lines may share the same data lines 102 and the same sensing lines 104. One horizontal period is a time obtained by dividing one frame period by the total number of the pixel lines L1 to Ln.

The display panel 100 may be implemented as a non-transmissive display panel or a transmissive display panel. The transmissive display panel may be applied to a transparent display apparatus in which an image is displayed on a screen and an actual object in the background is visible. The display panel 100 may be implemented as a flexible display panel.

Figure 2:
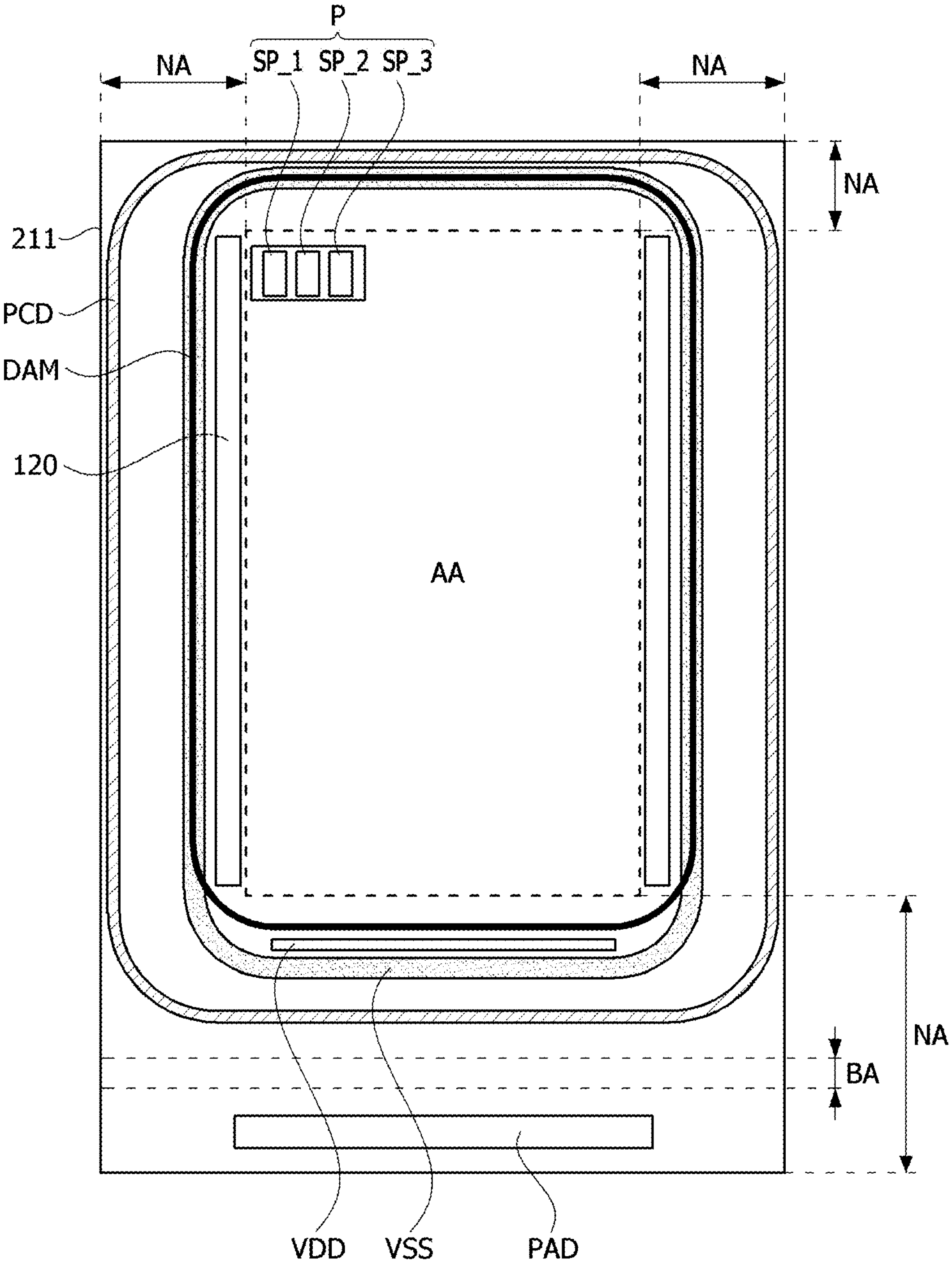
FIG. 2 is a plan view of a display apparatus according to an embodiment of the present specification.

FIG. 2 is a plan view of a display apparatus according to an embodiment of the present specification.

Referring to FIG. 2, a substrate 211 in the display apparatus may include a display area AA and a non-display area NA surrounding the display area AA. The non-display area NA of the substrate 211 may be adjacent to the display area AA and may be located outwardly from the display area AA.

The display area AA may be an area in which a plurality of pixels P is arranged to display an image. A pixel P may further include a plurality of sub-pixels SP_1, SP_2, and SP_3.

The plurality of sub-pixels SP are individual units that emit light, and each of the sub-pixel SP may emit, for example, red, green, blue, or white light, but is not limited thereto.

A thin film transistor and a light-emitting device layer may be arranged in each of the sub-pixels SP_1, SP_2, and SP_3. For example, a light-emitting element for displaying an image and a circuitry for driving the light-emitting element may be arranged in the plurality of sub-pixels SP.

Each sub-pixel SP may include a plurality of thin-film transistors and a storage capacitor. For example, the sub-pixel SP may be composed of two transistors and one capacitor (2T1C), but is not limited this configuration, and may also be implemented as a sub-pixel using other configuration such as 3T1C, 4T1C, 5T1C, 6T1C, 7T1C, 3T2C, 5T2C, 6T2C, 7T2, or 8T2C.

One pixel P may be composed of one or more sub-pixels SP that emit different colors. For example, one pixel P may include a first sub-pixel SP_1, a second sub-pixel SP_2, and a third sub-pixel SP_3.

Example shapes of the first sub-pixel SP_1, the second sub-pixel SP_2, and the third sub-pixel SP_3 may be, but are not limited to, rectangular, pentagonal, hexagonal, octagonal, circular, oval, and the like.

The first sub-pixel SP-1, the second sub-pixel SP-2, and the third sub-pixel SP-3 may emit different colors of light, and the first sub-pixel SP-1, the second sub-pixel SP-2, and the third sub-pixel SP-3 may emit at least one of red, green, or blue. The third sub-pixel SP_3 may have a larger area than the other sub-pixels. The third sub-pixel SP_3 may be arranged across other sub-pixels.

The non-display area NA may be an area in which no image is displayed, and may be an area in which various wires and driving circuits for driving a plurality of sub-pixels SP located in the display area AA are arranged. For example, various driving circuits such as gate drivers and data drivers may be arranged in the non-display area NA. The non-display area NA may be a bezel area, and is not limited to terms.

The non-display area NA may be located around the display area AA. For example, the non-display area NA may be located around the display area AA. The non-display area NA may be, but is not limited to, an area in which a plurality of sub-pixels SP are not arranged.

The display area AA and the non-display area NA may be in any shape suitable for the design of the electronic device with the display panel 100 mounted thereon. If the display apparatus is on a user-wearable device, it may have a circular shape, such as a common wristwatch, and the concepts of embodiments of the present specification may also apply to free-form displays, such as those found in a vehicle dashboard or the like. An example shape of the display area AA may be, but is not limited to, pentagonal, hexagonal, circular, oval, etc.

The display apparatus 100 of the present specification may include various additional elements for generating various signals or driving the plurality of sub-pixels SP_1, SP_2, and SP_3 within the display area AA. For example, one or more driving circuits for controlling the sub-pixels SP may be included in the display apparatus. The driving circuit for controlling (or driving) the sub-pixels SP_1, SP_2, and SP_3 may include a gate driver 120, a data driver (not shown), a multiplexer (not shown), an electro static discharge (ESD) circuit (not shown), power wires, inverter circuit, signal wires, and the like. The power wire may be a high-voltage voltage wire VDD and/or a low-voltage voltage wire VSS.

The display panel 100 may also include additional elements in addition to the function for driving the sub-pixels SP_1, SP_2, and SP_3. For example, the display panel 100 may include additional elements that provide a touch sensing function, a user authentication function (e.g., fingerprint recognition), a multi-level pressure sensing function, a tactile feedback function, and the like. The aforementioned additional elements may be located in the non-display area NA or in an external circuit connected through a connection interface.

A pad part PAD may be located at one side of the non-display area NA. The pad part PAD may be a metal pattern to which external modules, such as flexible printed circuit boards (FPCB) and chip on films (COF), are bonded. While the pad part PAD is shown to be located at one side of the substrate 211, the shape and location of the pad part is not limited thereto.

The gate driver 120 for providing the gate signal to the thin film transistor may be arranged on the other side of the non-display area NA. The data driver 120 may supply a data voltage of pixel data to the data lines 103. The gate driver 120 may include various gate driving circuits, and the gate driving circuits may be formed directly on the substrate 211. In this case, the gate driver 120 may be a gate-in-panel (GIP).

The gate driver 120 may be located between the display area AA and the dam DAM arranged in the non-display area NA of the substrate 211.

The gate driver 120 may include a scan driving circuit, a light-emission driving circuit, and a signal wire.

The signal wire may transmit and control the signal supplied from the pad part to the scan driving circuit or the light-emission driving circuit. For example, the signal wire may be a clock wire.

The data driver that provides a data signal to the thin film transistor may be arranged on the other side of the non-display area NA. The data driver may include a variety of data driving circuits.

The high-potential voltage wire VDD, the low-potential voltage wire VSS, a multiplexer, an antistatic circuitry, and a plurality of connection wire parts may be arranged between the display area AA and the data driver. These components may be arranged between the display area AA and a bending area BA.

A connection wire part may be located in the non-display area NA. For example, it may be located in the bending area BA, in which the substrate is bent, in the non-display area NA. The connection wire part may be configured to deliver signals (voltage) from an external module bonded to the pad part to the display area AA or to the circuitry such as the gate driver 120 and the data driver. For example, various signals, such as the data signal, the high potential voltages, and the low potential voltage, for driving the gate driver 120 may be delivered through the connection wire part.

The dam DAM may be located in the non-display area NA to surround the entirety or a portion of the display area AA. The dam DAM may be adjacent to the display area AA and may be located outside of the display area AA.

The DAM may be located along the periphery of the display area AA to control the flow of a layer containing organic material among the encapsulation layer arranged on the light-emitting element layer. The dam DAM may be multiple. The dam DAM may be arranged between the display area AA and the high-voltage voltage wire VDD, the low-voltage voltage wire VSS, the multiplexer, or the anti-static circuitry.

A panel crack detector PCD may further arranged in a portion of the non-display area NA of the substrate 211. The panel crack detector PCD may be arranged between an end point (or end) of the substrate 211 and the dam DAM. Alternatively, the panel crack detector PCD may be located downstream of the dam DAM and it may overlap with the dam DAM at least partially.

Figure 3:
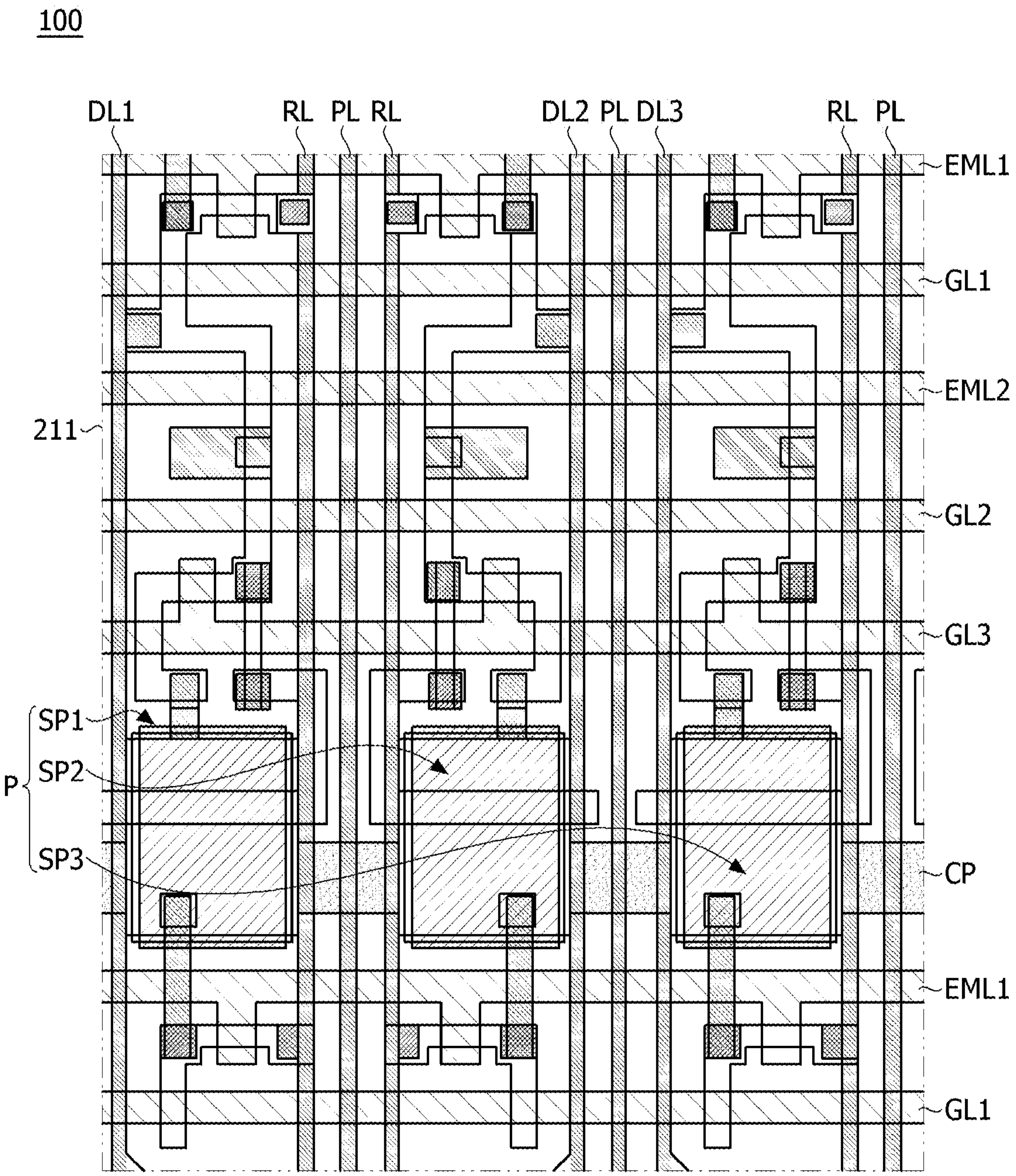
FIG. 3 is a plan view illustrating a pixel according to an embodiment of the present specification.

FIG. 3 is a plan view illustrating a pixel according to an embodiment of the present specification.

Referring to FIG. 3, in the display apparatus 100 of the present specification, three sub-pixels SP1, SP2, and SP3 which are consecutive in one direction (left and right direction) may constitute one pixel P. Within each pixel P, each sub-pixels SP may be arranged to be spaced apart from each other at a predetermined interval.

Within one pixel P, first to third data wires DL1, DL2, and DL3 extending in the Y-axis direction may be arranged corresponding to the boundaries of each sub-pixel SP1, SP2, and SP3.

Power wires PL extending in the first direction and for applying a high-potential power voltage may be arranged at the boundaries between the sub-pixels SP1, SP2, and SP3. Reference wires RL for applying a reference voltage Vref may be arranged at the boundaries of sub-pixels SP1, SP2, and SP3 adjacent to the power wires PL, respectively. In addition, an initialization wire for applying an initialization voltage Vinit may also be arranged at the boundary of each of the sub-pixels SP1, SP2, and SP3 adjacent to the power wires PL.

Gate wires GL1, GL2, GL3, and GLA intersecting with the first to third data wires DL1, DL2, and DL3, the power wires PL, and reference wires RL and extending in the X-axis direction may be arranged at the upper and lower neighboring boundaries of each of the sub-pixels SP1, SP2, and SP3. Emission control signal wires EML1, EML2, and EML3 may be arranged to be spaced apart from the gate wires GL1, GL2, GL3, and GL4 and to be parallel to each other.

With the recent development of the display apparatus having a higher resolution and a higher pixel integration, the constraints on the pixel arrangement space are increasing, and the power lines PL and the reference lines RL may be formed to be shared by the plurality of sub-pixels SP. This is a method of saving the space occupied by the signal wires by reducing the number of signal wires that supply signals common to each sub-pixel SP, and may be called as a flip structure in which the power wire PL and the reference wire RL are shared by two adjacent sub-pixels SP.

Accordingly, some sub-pixels SP may be directly connected to the power wire PL and the reference wire RL, and some other sub-pixels SP may not be directly connected to the power wire PL and the reference wire RL, but may be connected to each of the power wire PL and the reference wire RL through a separate connection pattern CP.

Figure 4:
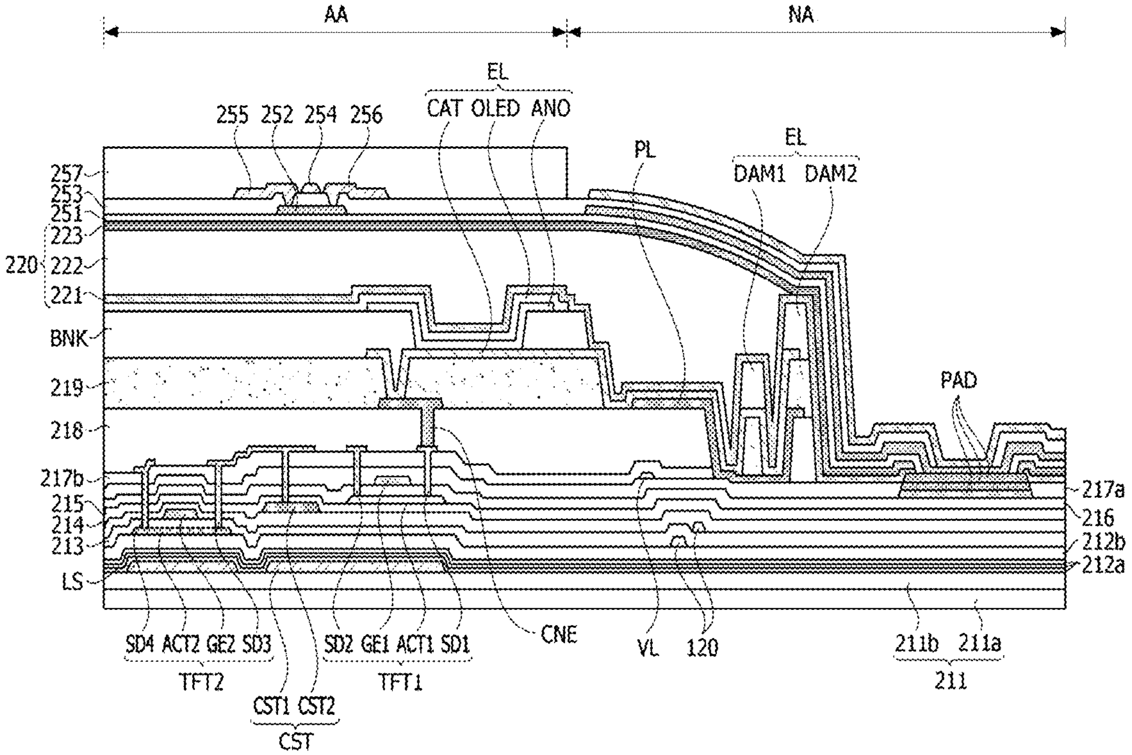
FIG. 4 is a cross-sectional view illustrating a display apparatus according to an embodiment of the present specification.

FIG. 4 is a cross-sectional view illustrating a display apparatus according to an embodiment of the present specification.

Referring to FIG. 4, the display apparatus may include two thin-film transistors TFT1 and TFT2 and one capacitor CST. The two thin-film transistors TFT1 and TFT2 may include a first thin-film transistor TFT1 including a polycrystalline semiconductor material and a second thin-film transistor TFT2 including an oxide semiconductor material.

The one pixel P may include a light-emitting element EL and a pixel driving circuit that applies a driving current to the light-emitting element EL. The pixel driving circuit may be located on a substrate 211, and the light-emitting element EL may be located on the pixel driving circuit. In addition, an encapsulation layer 220 may be located on the light-emitting element EL. The encapsulation layer 220 may protect the light-emitting element EL.

The pixel driving circuit refers to one pixel P array part including a driving thin-film transistor, a switching thin-film transistor, and a capacitor. In addition, the light-emitting element EL refers to a light-emitting array part including an anode electrode, a cathode electrode, and an emission layer located therebetween.

In one embodiment, the driving thin-film transistor and at least one switching thin-film transistor may use an oxide semiconductor as an active layer. The thin-film transistor using the oxide semiconductor material as the active layer has excellent leakage current blocking effects and relatively low manufacturing costs compared with the thin-film transistor using the polycrystalline semiconductor material as the active layer. Therefore, in order to reduce power consumption and lower manufacturing cost, the pixel driving circuit according to one embodiment may include the driving thin-film transistor and at least one switching thin-film transistor using the oxide semiconductor material.

All of the thin-film transistors constituting the pixel driving circuit may be implemented using the oxide semiconductor materials, or only some of the switching thin-film transistors may be implemented using the oxide semiconductor materials.

However, since it is difficult to ensure reliability in the thin-film transistor using the oxide semiconductor material, and the thin-film transistor using the polycrystalline semiconductor material has a fast operating speed and excellent reliability, one embodiment may include both the switching thin-film transistor using the oxide semiconductor material and the switching thin-film transistor using the polycrystalline semiconductor material.

The substrate 211 may be implemented as a multi-layer in which an organic film and an inorganic film are alternately stacked. For example, the substrate 211 may be stacked with an organic film such as polyimide and an inorganic film such as silicon oxide ($SiO_2$) alternately stacked.

A lower buffer layer 212*a* may be formed on the substrate 211. The lower buffer layer 212*a* is intended to block moisture or the like which may penetrate from the outside, and may be used by stacking the films of silicon oxide $SiO_2$ or the like as a multi-layer. An auxiliary buffer layer 212*b* may be further located on the lower buffer layer 212*a* to protect elements from moisture penetration.

The first thin-film transistor TFT1 may be formed on the substrate 211. The first thin-film transistor TFT1 may use a polycrystalline semiconductor as an active layer. The first thin-film transistor TFT1 may include a first active layer ACT1 including a channel through which electrons or holes move, a first gate electrode GE1, a first source electrode SD1, and a first drain electrode SD2.

The first active layer ACT1 may include a first channel region, a first source region located on one side with the first channel region interposed therebetween, and a first drain region located on the other side.

The first source region and the first drain region are regions in which an intrinsic polycrystalline semiconductor material is doped with Group 5 or Group 3 impurity ions, such as phosphorus (P) or boron (B), at a predetermined concentration to make it conductive. The first channel region may maintain an intrinsic state of the polycrystalline semiconductor material to provide a path through which electrons or holes move.

Meanwhile, the first thin-film transistor TFT1 may include a first gate electrode GE1 overlapping the first channel region of the first active layer ACT1. A first gate insulating layer 213 may be located between the first gate electrode GE1 and the first active layer ACT1. The first gate insulating layer 213 may be used by stacking inorganic layers such as a silicon oxide $SiO_2$ film or silicon nitride SiNx as a single or multi-layer.

In one embodiment, the first thin-film transistor TFT1 has a top gate structure in which the first gate electrode GE1 is positioned on an upper portion of the first active layer ACT1. Accordingly, a first electrode CST1 included in the capacitor CST and a light shielding layer LS included in the second thin-film transistor TFT2 may be formed of the same material as the first gate electrode GE1. A masking process may be reduced by forming the first gate electrode GE1, the first electrode CST1, and the light shielding layer LS by a single masking process. However, the present specification is not limited to this, the light shielding layer LS may be formed on the lower buffer layer 212*a* and the auxiliary buffer layer 212*b* by a separate masking process. In this case, the light shielding layer LS is not limited to the second thin-film transistor TFT2 and may be formed at a lower portion of all transistors. In addition, the light shielding layer LS may be located to overlap a lower portion of the capacitor CST to form a double capacitor.

When the substrate 211 is formed of a transparent material, the light shielding layer LS may be formed on lower portions of the active layers ACT1 and ACT2. The light shielding layer LS may block light passing through the transparent substrate 211 to the active layers ACT1 and ACT2 to maintain the functions of the active layers ACT1 and ACT2. The light shielding layer LS may be formed in the lower buffer layer 212*a* or the auxiliary buffer layer 212*b*.

The first gate electrode GE1 may be formed of a metallic material. For example, the first gate electrode GE1 may be a single layer or multiple layer made of, but is not limited to, any one of molybdenum (Mo), aluminum (Al), chromium (Cr), gold (Au), titanium (Ti), nickel (Ni), neodymium (Nd), copper (Cu), or an alloy thereof.

A first interlayer insulating layer 214 may be located on the first gate electrode GE1. The first interlayer insulating layer 214 may be implemented with silicon oxide ($SiO_2$), silicon nitride (SiNx), or the like.

The display panel 100 may further include an upper buffer layer 215, a second gate insulating layer 216, and a second interlayer insulating layer 217 sequentially arranged on a first interlayer insulating layer 214, and the first thin-film transistor TFT1 may include a first source electrode SD1 and a first drain electrode SD2 formed on the second interlayer insulating layer 217 and connected to each of a first source region and a first drain region.

The first source electrode SD1 and the first drain electrode SD2 may be a single layer or multiple layers made of, but is not limited to, any one of molybdenum (Mo), aluminum (Al), chromium (Cr), gold (Au), titanium (Ti), nickel (Ni), neodymium (Nd), copper (Cu), or an alloy thereof.

The upper buffer layer 215 may separate the second active layer ACT2 of the second thin-film transistor TFT2 implemented with an oxide semiconductor material from the first active layer ACT1 implemented with a polycrystalline semiconductor material, and may provide a basis for forming the second active layer ACT2.

The second gate insulating layer 216 covers the second active layer ACT2 of the second thin-film transistor TFT2. Since the second gate insulating layer 216 is formed on the second active layer ACT2 implemented with an oxide semiconductor material, it may be implemented with an inorganic film. For example, the second gate insulating layer 216 may be silicon oxide ($SiO_2$), silicon nitride (SiNx), or the like.

The second gate electrode GE2 may be formed of a metallic material. For example, the second gate electrode GE2 may be a single layer or multiple layer made of, but is not limited to, any one of molybdenum (Mo), aluminum (Al), chromium (Cr), gold (Au), titanium (Ti), nickel (Ni), neodymium (Nd), copper (Cu), or an alloy thereof.

Meanwhile, the second thin-film transistor TFT2 may include the second active layer ACT2 formed on the upper buffer layer 215 and implemented with an oxide semiconductor material, the second gate electrode GE2 located on the second gate insulating layer 216, a second source electrode SD3 located on the second interlayer insulating layer 217, and a second drain electrode SD4.

The second active layer ACT2 may include an intrinsic second channel region implemented with an oxide semiconductor material and not doped with impurities, and a second source region and a second drain region doped with impurities to be conductive.

The second thin-film transistor TFT2 may further include the light shielding layer LS positioned on a lower portion of the upper buffer layer 215 and overlapping the second active layer ACT2. The light shielding layer LS may block light incident on the active layer 401 to ensure the reliability of the second thin-film transistor TFT2. The light shielding layer LS may be formed of the same material as the first gate electrode GE1 and may be formed on the upper surface of the first gate insulating layer 213 The light shielding layer LS may be electrically connected to the second gate electrode GE2 to form a dual gate.

The second source electrode SD3 and the second drain electrode SD4 may be simultaneously formed of the same material on the second interlayer insulating layer 217 together with the first source electrode SD1 and the first drain electrode SD2, thereby reducing the number of masking processes.

Meanwhile, the capacitor CST may be implemented by arranging a second electrode CST2 to overlap the first electrode CST1 on the first interlayer insulating layer 214. The second electrode CST2 may be a single layer or multiple layers made of, for example, any one of molybdenum (Mo), aluminum (Al), chromium (Cr), gold (Au), titanium (Ti), nickel (Ni), neodymium (Nd), copper (Cu), or an alloy thereof.

The capacitor CST may store a data voltage applied through the data line DL for a certain period of time and then provide it to the light-emitting element EL. The capacitor CST may include two electrodes corresponding to each other and a dielectric located therebetween. The first interlayer insulating layer 214 may be located between the first electrode CST1 and the second electrode CST2.

The first electrode CST1 or the second electrode CST2 of the capacitor CST may be electrically connected to the second source electrode SD3 or the second drain electrode SD4 of the second thin-film transistor TFT2. However, the specification is not limited to this and the connection relationship of the capacitor CST may change depending on the pixel driving circuit.

Meanwhile, a first planarized layer 218 and a second planarized layer 219 may be sequentially located over the pixel driving circuit to planarize an upper end of the pixel driving circuit. The first planarized layer 218 and the second planarized layer 219 may be organic films such as polyimide or acrylic resin. The light-emitting element EL may be formed on the second planarized layer 219.

The light-emitting element EL may include an anode electrode ANO, a cathode electrode CAT, and an emission layer OLED located between the anode electrode ANO and the cathode electrode CAT. When a pixel driving circuit is implemented in which a low potential voltage connected to the cathode electrode CAT is used in common, the anode electrode ANO may be arranged as a separate electrode for each sub-pixel. When the pixel driving circuit is implemented using a high potential voltage in common, the cathode electrode CAT may be arranged as a separate electrode for each sub-pixel.

The light-emitting element EL may be electrically connected to a driving element through an intermediate electrode CNE located on the first planarized layer 218. Specifically, the anode electrode ANO of the light-emitting element EL and the first source electrode SD1 of the first thin-film transistor TFT1 constituting the pixel driving circuit may be connected to each other by the intermediate electrode CNE.

The anode electrode ANO may be connected to the exposed intermediate electrode CNE through a contact hole penetrating the second planarized layer 219. In addition, the intermediate electrode CNE may be connected to the first source electrode SD1 exposed through a contact hole penetrating the first planarization layer 218.

The intermediate electrode CNE may act as a medium connecting the first source electrode SD1 and the anode electrode ANO. The intermediate electrode CNE may be made of a conductive material such as copper (Cu), silver (Ag), molybdenum (Mo), or titanium (Ti).

The anode electrode ANO may be formed into a multi-layer structure including a transparent conductive film and an opaque conductive film with high reflection efficiency. The transparent conductive film may be formed of a material having a relatively high work function value, such as indium-tin-oxide (ITO) or indium-zinc-oxide (IZO), and the opaque conductive film may be formed of a single-layer or multi-layer structure including aluminum (Al), silver (Ag), copper (Cu), lead (Pb), molybdenum (Mo), titanium (Ti), or an alloy thereof. For example, the anode electrode ANO may be formed with a structure in which a transparent conductive film, an opaque conductive film, and a transparent conductive film are sequentially stacked, or may be formed with a structure in which a transparent conductive film and an opaque conductive film are sequentially stacked.

The emission layer OLED may be formed by stacking a hole-related layer, an organic emission layer, and an electron-related layer on the anode electrode ANO in the order or in the reverse order.

A bank layer BNK may be a pixel defining film exposing the anode electrode ANO of each pixel P. The bank layer BNK may be formed of an opaque material (for example, black) to prevent the light interference between adjacent pixels P. In this case, the bank layer BNK may include a light shielding material composed of at least one of a color pigment, organic black, and carbon. A spacer may be further located on the bank layer BNK.

The cathode electrode CAT faces the anode electrode ANO with the emission layer OLED interposed therebetween and may be formed on the upper surface and the side surface of the emission layer OLED. The cathode electrode CAT may be formed integrally over the entire display area AA. The cathode electrode CAT may be made of a transparent conductive film, such as indium-tin-oxide (ITO) or indium-zinc-oxide (IZO), when applied to a front light-emitting-type organic light-emitting display apparatus.

The encapsulation layer 220 for suppressing moisture penetration may be further arranged on the cathode electrode CAT.

The encapsulation layer 220 may block external moisture or oxygen from penetrating into the light-emitting element EL, which is susceptible to external moisture or oxygen. For this purpose, the encapsulation layer 220 may have, but is not limited to, at least one inorganic encapsulation layer and at least one organic encapsulation layer. In this specification, the structure of the encapsulation layer 220 in which a first encapsulation layer 121, a second encapsulation layer 122, and a third encapsulation layer 123 are sequentially stacked is described as an example.

The first encapsulation layer 121 may be formed on a substrate 211 on which the cathode electrode CAT is formed. The third encapsulation layer 123 may be formed on the substrate 211 on which the second encapsulation layer 122 is formed, and may be formed to surround the upper surface, lower surface, and side surface of the second encapsulation layer 122 together with the first encapsulation layer 121. These first encapsulation layer 121 and third encapsulation layer 123 may minimize or prevent external moisture or oxygen from penetrating into the light-emitting element EL. The first encapsulation layer 121 and the third encapsulation layer 123 may be formed of an inorganic insulating material capable of being deposited at a low-temperature, such as silicon nitride (SiNx), silicon oxide (SiOx), silicon oxynitride (SiON), or aluminum oxide (Al2O3). Since the first encapsulation layer 121 and the third encapsulation layer 123 are deposited in a low-temperature atmosphere, it is possible to prevent damage to the light-emitting element EL, which is susceptible to a high-temperature atmosphere, during the deposition process of the first encapsulation layer 121 and the third encapsulation layer 123.

The second encapsulation layer 122 may act as a buffer to relieve stress between the layers due to bending of the display apparatus 10 and may planarize a step difference between the layers. This second encapsulation layer 122 may be formed of, but is not limited to, a non-photosensitive organic insulating material such as an acrylic resin, an epoxy resin, a phenolic resin, a polyamide resin, a polyimide resin, and polyethylene or silicon oxycarbonate (SiOC), or a photosensitive organic insulating material such as photoacrylic, on the substrate 211 on which the first encapsulation layer 121 is formed. When the second encapsulation layer 122 is formed using an ink jet method, a dam DAM may be located to prevent the second encapsulation layer 122 in liquid form from diffusing to the edge of the substrate 211. The dam DAM may be located closer to the edge of the substrate 211 than the second encapsulation layer 122. The dam DAM may prevent the second encapsulation layer 122 from diffusing into a pad region in which a conductive pad located on the outermost portion of the substrate 211 is arranged.

The dam DAM is designed to prevent diffusion of the second encapsulation layer 122, but if the second encapsulation layer 122 is formed to exceed the height of the dam DAM during the process, the second encapsulation layer 122, which is an organic layer, may be exposed to the outside, so that moisture or the like may easily penetrate into the light-emitting element. Therefore, to prevent this, the dam DAM may be formed in duplicates of at least 10 or more.

The dam DAM may be located on the second interlayer insulating layer 217 of a non-display area NDA.

In addition, the dam DAM may be formed simultaneously with the first planarized layer 218 and the second planarized layer 219. When the first planarized layer 218 is formed, a lower layer of the dam DAM may be formed together, and when the second planarized layer 219 is formed, an upper layer of the dam DAM may be formed together, thereby being stacked in a double structure.

Accordingly, the dam DAM may be made of, but is not limited to, the same material as the first planarized layer 218 and the second planarized layer 219.

The dam DAM may be formed by overlapping a low-potential voltage wire. For example, the low-potential voltage wire may be formed in a lower layer of an area in which the dam DAM is located in the non-display region NDA.

The gate driver configured in the form of a low-potential voltage wire and a gate in panel (GIP) is formed in a form surrounding an outer periphery of the display panel, and the low-potential voltage wire may be located further outside the gate driver. In addition, the low-potential voltage wire may be connected to the cathode electrode CAT to apply a common voltage. The gate driver is simply represented in the plan and cross-sectional diagrams, but may be configured using a thin-film transistor having the same structure as the thin-film transistor of the display area AA.

The low-potential voltage wire may be located outside the gate driver. The low-potential voltage wire may be located outside the gate driver and surround the display area AA. For example, the low-potential voltage wire may be made of, but is not limited to, the same material as the first gate electrode GE1, and may be made of, but is not limited to, the same material as the second electrode CST2 or the first source and drain electrodes SD1 and SD2.

In addition, the low-potential voltage wire may be electrically connected to the cathode electrode CAT. The low-potential voltage wire may supply a low-potential driving voltage EVSS to the plurality of pixels P in the display area AA.

A touch layer may be located on the encapsulation layer 220. In the touch layer, a touch buffer film 251 may be located between a touch sensor metal including touch electrode connection lines 252 and 254 and touch electrodes 255 and 256 and the cathode electrode CAT of the light-emitting element EL.

The touch buffer film 251 may block a chemical liquid (such as a developer, etchant or the like) used in a process of manufacturing a touch sensor metal located on the touch buffer film 251 or moisture from the outside from penetrating into the emission layer OLED containing an organic material. Accordingly, the touch buffer film 251 may prevent damage to the emission layer OLED which is susceptible to the chemical liquid or moisture.

The touch buffer film 251 may be formed of an organic insulating material that may be formed at a low temperature below a certain temperature (e.g., 100 degrees) and has a low dielectric constant of 1 to 3 in order to prevent damage to the emission layer OLED including an organic material which is sensitive to high temperatures. For example, the touch buffer film 251 may be formed of a material of the acrylic, epoxy, or siloxane-based material. The touch buffer film 251 having a planarization performance with an organic insulating material may prevent damage to an encapsulation layer 220 and cracking of a touch sensor metal formed on the touch buffer film 251 due to bending of the organic light-emitting display apparatus.

According to the mutual-capacitance based touch sensor structure, touch electrodes 255 and 256 are arranged on the touch buffer film 251, and the touch electrodes 255, 256 may be arranged to cross each other.

Touch electrode connection lines 252 and 254 may electrically connect between the touch electrodes 255 and 256. The touch electrode connection lines 252 and 254 and the touch electrodes 255 and 256 may be located on different layers with the touch insulating film 253 interposed therebetween.

The touch electrode connection lines 252 and 254 are arranged to overlap with a bank layer 165, which may prevent an aperture ratio from being reduced.

Meanwhile, the touch electrodes 255 and 256 may be electrically connected to a touch driving circuit (not shown) through a touch pad PAD by passing a portion of the touch electrode connection line 252 through the upper and side surfaces of the encapsulation layer 220 and the upper and side surfaces of the dam DAM.

The portion of the touch electrode connection line 252 may receive a touch driving signal from the touch driving circuit and transmit it to the touch electrodes 255 and 256, and may also transmit a touch sensing signal from the touch electrodes 255 and 256 to the touch driving circuit.

A touch protection film 257 may be located on the touch electrodes 255 and 256. In the drawing, the touch protection film 257 is shown as being located only on, but not limited to, the touch electrodes 255 and 256, and the touch protection film 257 may extend to before or after the dam DAM and may also be located on the touch electrode connection line 252.

In addition, a color filter (not shown) may be further arranged on the encapsulation layer 220, and the color filter may be positioned on the touch layer or between the encapsulation layer 220 and the touch layer.

Figure 5:
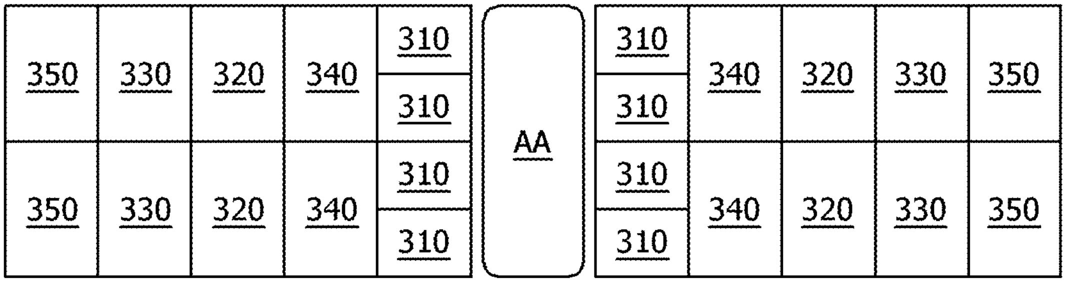
FIG. 5 is a diagram illustrating a gate driver according to an embodiment of the present specification.

FIG. 5 is a diagram illustrating a gate driver according to an embodiment of the present specification.

Referring to FIG. 5, the gate driver may include a plurality of gate drivers configured to output pulses of gate signals. According to one embodiment, the gate driver may include a first gate driver 310 outputting a first gate signal SC1, a second gate driver 320 outputting a second gate signal SC2, a third gate driver 330 outputting a third gate signal SC3, a fourth gate driver 340 outputting a fourth gate signal EM1, and a fifth gate driver 350 outputting a fifth gate signal EM2.

Some of the plurality of gate drivers may be implemented as shift register circuits, and the remainder may be implemented as edge trigger circuits. For example, the first gate driver 310 may be implemented as the shift register circuit, and the second gate driver 320 to the fifth gate driver 350 may be implemented as the edge trigger circuits. The shift register circuit may output a gate signal to only one pixel line, while the edge trigger circuit may output the gate signal commonly to two or more pixel lines. Accordingly, the first gate driver 310 implemented as the shift register circuit may be connected to each of the odd-th pixel line and the even-th pixel line.

In addition, the second gate driver 320 to the fifth gate driver 350 implemented as the edge trigger circuit may be connected in common to two pixel lines.

In one embodiment, the fourth gate signal EM1 and the fifth gate signal EM2 may be emission control signals, and the first gate signal SC1, the second gate signal SC2, and the third gate signal SC3 may be scan signals.

The fifth gate driver 350, which outputs the fifth gate signal EM2 which is an emission control signal, may be located at the outermost portion of the gate driver. In addition, the second gate driver 320 which outputs the second gate signal SC2 which is a scan signal, and the third gate driver 330 which outputs the third gate signal SC3 may be located between the fourth gate driver 340, which outputs the fourth gate signal EM1, and the fifth gate driver 350.

The fourth gate driver 340, which outputs the fourth gate signal EM1, may be located between the first gate driver 310, which outputs the first gate signal SC1 which is a scan signal, and the second gate driver 320. However, the present specification is not limited to this.

As shown, the gate drivers 340 and 350 which output the emission control signal and the gate drivers 310, 320, and 330 which output the scan signal are shown to be arranged symmetrically left and right with respect to the display area AA, but the embodiment of the present specification is not limited thereto. For example, the gate drivers 340 and 350 which output the emission control signal and the gate drivers 310, 320, and 330 which output the scan signal may be arranged asymmetrically left and right with respect to the display area AA.

Figure 6:
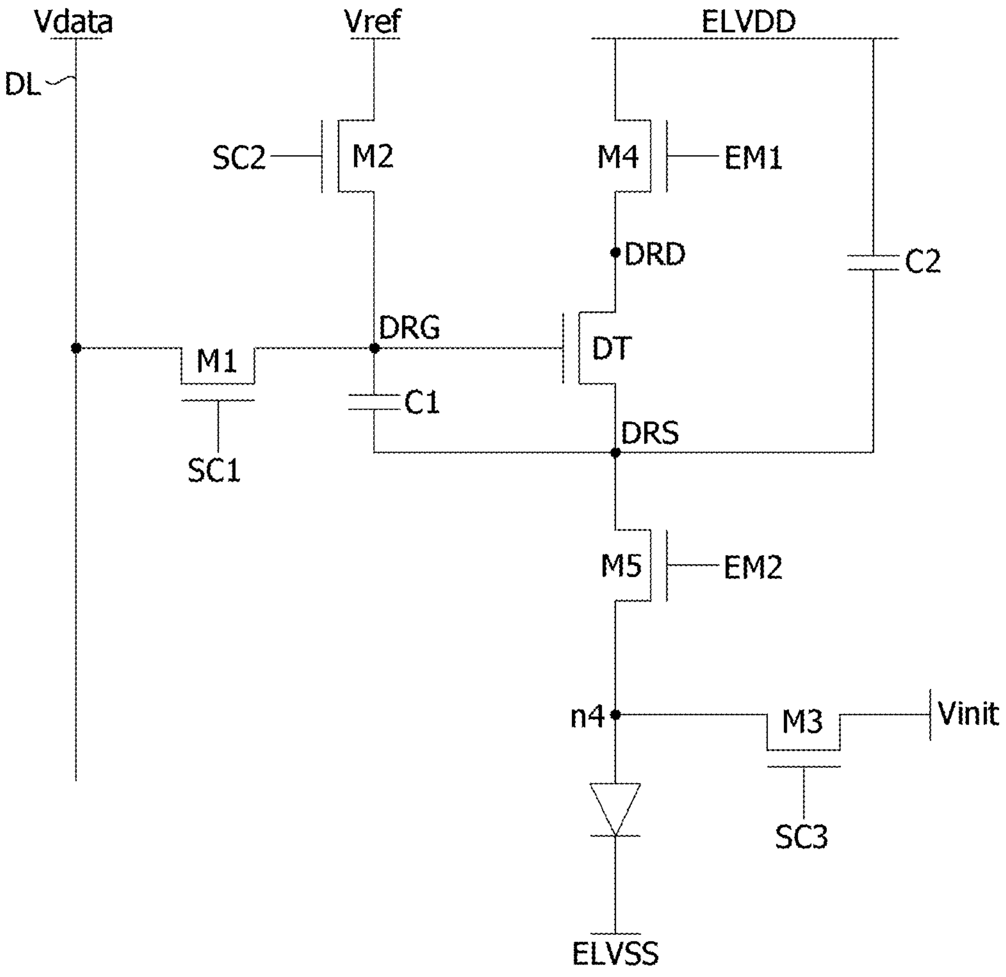
FIG. 6 is a circuit diagram illustrating a pixel circuit.
Figure 7:
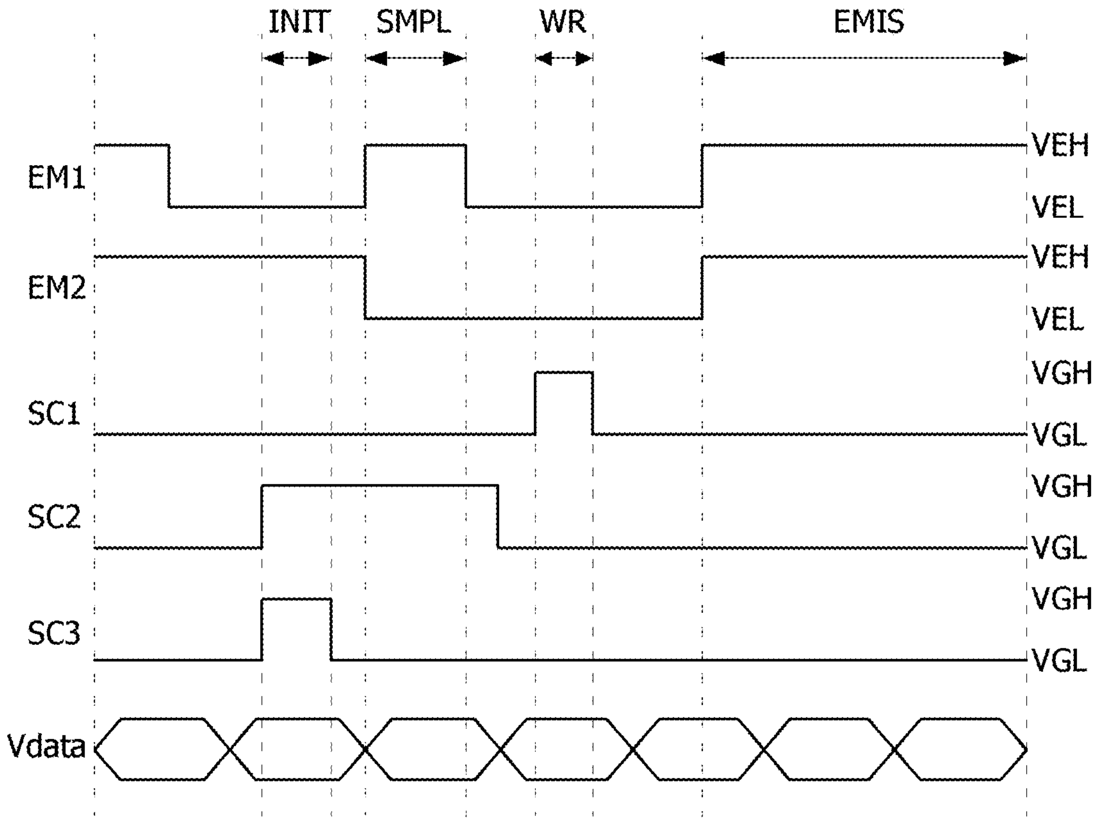
FIG. 7 is a waveform diagram illustrating a method of driving the pixel circuit of FIG. 6.

FIG. 6 is a circuit diagram illustrating a pixel circuit. FIG. 7 is a waveform diagram illustrating a method of driving the pixel circuit of FIG. 6.

Referring to FIGS. 6 and 7, the pixel circuit may include a light-emitting element EL, a driving element DT which supplies current to the light-emitting element EL, a plurality of switch elements M1 to M5, a first capacitor C1, and a second capacitor C2. The driving element DT and the switch elements M1, M2, M3, M4, and M5 may be implemented with n-channel transistors. The pixel circuit may further include a plurality of nodes.

The gate signal may include a first scan pulse (or first gate pulse, SC1), a second scan pulse (or second gate pulse, SC2), a third scan pulse (or third gate pulse, SC3), a first EM pulse (or fourth gate pulse, EM1), and a second EM pulse (or fifth gate pulse, EM2).

The gate driver may include a first shift register which sequentially outputs the first scan pulse SC1, a second shift register which sequentially outputs the second scan pulse SC2, a third shift register which sequentially outputs the third scan pulse SC3, a fourth shift register which sequentially outputs the first EM pulse EM1, and a fifth shift register which sequentially outputs the second EM pulse EM2.

A constant voltage such as a pixel driving voltage ELVDD, a low-potential power supply voltage ELVSS, a reference voltage Vref, and an initialization voltage Vinit may be applied to the pixel circuit. The pixel drive voltage ELVDD may be higher than the low-level power supply voltage ELVDD.

The gate-on voltage VGH, VEH may be set higher than the pixel driving voltage ELVDD. The gate-off voltages VGL and VEL may be set lower than the low-potential power supply voltage ELVDD. However, the present specification is not limited to this. In the specification, the gate-on voltage VGH, VEH may sometimes be referred to as the gate-on voltage ON, and the gate-off voltages VGL and VEL may be referred to as the gate-on voltage OFF.

The initialization voltage Vinit may be set to a low-potential voltage higher than the low-potential power supply voltage ELVSS. The reference voltage Vref may be set to a voltage at which the driving element DT may be turned on. The reference voltage Vref may be set to a voltage within the voltage range of a data voltage Vdata output from the data driver. The maximum voltage of the data voltage Vdata may be lower than the pixel driving voltage ELVDD, and the minimum voltage of the data voltage Vdata may be higher than the low-potential power supply voltage ELVSS.

In order to sample a threshold voltage Vth of the driving element DT in the sampling phase, the reference voltage Vref is preferably set to a voltage higher than the initialization voltage Vinit. A voltage difference between the reference voltage Vref and the initialization voltage Vinit may be set to a voltage higher than the threshold voltage Vth of the driving element DT. In order to implement the lowest luminance of the pixel, that is, the luminance of the black gray scale, the initialization voltage Vinit may have to be set to a voltage lower than the threshold voltage of the light-emitting element EL.

A method of driving the pixel circuit may include an initialization phase INIT, a sampling phase SMPL set following the initialization phase INIT, an addressing phase WR set following the sampling phase SMPL, and an emission phase EMIS set following the addressing phase WR.

The first scan pulse SC1 may be generated as the gate-on voltage VGH in the addressing phase WR in synchronization with the data voltage Vdata of the pixel data. The first scan pulse SC1 may be the gate-off voltage VGL in the initialization phase INIT, the sampling phase SMPL, and the emission phase EMIS.

The second scan pulse SC2 may be generated as the gate-on voltage VGH in the initialization phase INIT and the sampling phase SMPL. The second scan pulse SC2 may be the gate-off voltage VGL in the addressing phase WR and the emission phase EMIS.

The third scan pulse SC3 may be generated as the gate-on voltage VGH in the initialization phase INIT. The third scan pulse SC3 may be the gate-off voltage VGL in the sampling phase SMPL, the addressing phase WR, and the emission phase EMIS.

The first EM pulse EM1 may be the gate-off voltage VEL in the initialization phase INIT and the addressing phase WR. However, the present specification is limited thereto, the first EM pulse EM1 may also be generated as the gate-on voltage VEH in the initialization phase INIT. The first EM pulse EM1 may be the gate-on voltage VEH in the sampling phase SMPL and the emission phase EMIS.

The second EM pulse EM2 may be generated as the gate-on voltage VEH in the initialization phase INIT and the emission phase EMIS. The second EM pulse EM2 may be the gate-off voltage VEL in the sampling phase SMPL and the addressing phase WR.

Each of the switch elements M1 to M5 may be turned on when the gate-on voltages VGH and VEH are applied to its gate electrode, and may be turned off when the gate-off voltages VGL and VEL are applied to its gate electrode. The driving element DT may be turned on when a gate-source voltage Vgs is higher than the threshold voltage Vth and may generate a current according to the gate-source voltage Vgs to drive the light-emitting element EL.

The light-emitting element EL may be implemented as an OLED. The OLED may include an organic compound layer formed between an anode electrode and a cathode electrode. The organic compound layer may include, but is not limited to, a hole injection layer (HIL), a hole transport layer (HTL), an emission layer (EML), an electron transport layer (ETL), and an electron injection layer (EIL).

The anode electrode of the light-emitting element EL may be connected to the fourth node n4, and the cathode electrode thereof may be connected to a VSS node to which a low potential power voltage ELVSS is applied. The VSS node may be connected to a VSS line.

When a voltage is applied to the anode and cathode electrodes of the light-emitting element EL, holes passing through the hole transport layer (HTL) and electrons passing through the electron transport layer (ETL) may be moved to the emission layer (EML) to form excitons. In this case, light may be emitted from the emission layer (EML). The wavelength band of light may be the wavelength band of visible light.

The driving element DT may include a gate electrode connected to a second node DRG, a first electrode connected to a first node DRD, and a third electrode connected to a third node DRS Therefore, the voltage applied to each of the electrodes of the driving element DT may be equal to the voltage of the first to third nodes DRD, DRG, and DRS.

A first capacitor C1 is connected between the second node DRG and the third node DRS. The first capacitor C1 may store the gate-source voltage Vgs of the driving element DT.

A second capacitor C2 may be connected between the third node DRS and the VDD line. The pixel driving voltage ELVDD may be applied to the VDD line.

The first capacitor C1 and the second capacitor C2 may determine a transmission rate of the data voltage Vdata from the gate-source voltage Vgs of the driving element DT depending on a capacitance ratio thereof. The capacitances of the first capacitor C1 and the second capacitor C2 may be appropriately selected according to a voltage range of the data voltage Vdata and the driving characteristics of the display panel.

In the pixel circuit, the gate-source voltage Vgs of the driving element DT in the emission phase EMIS may be given by $Vgs=1-C'\times(Vdata-Vref)+Vth$. It may be $C'=C1/(C1+C2)$. If $C2=0$, then $C'=1$, and in the above formula, $1-C'$ becomes 0 (zero), and $Vgs=Vth$ may be obtained. Therefore, the second capacitor C2 may be required to vary the gate-source voltage Vgs of the driving element DT according to the data voltage Vdata of the pixel data.

The first switch element M1 may be turned on according to the gate-on voltage VGH of the first scan pulse SC1 to supply the data voltage Vdata to the second node DRG in the addressing phase WR. The first switch element M1 may include a gate electrode connected to a first gate line to which the first scan pulse SC1 is applied, a first electrode connected to the data line DL to which the data voltage Vdata is applied, and a second electrode connected to the second node DRG.

The second switch element M2 may be turned on according to the gate-on voltage VGH of the second scan pulse SC2 to supply the reference voltage Vref to the second node DRG in the initialization phase INIT and the sampling phase SMPL. The second switch element M2 may include a gate electrode connected to a second gate line to which the second scan pulse SC2 is applied, a first electrode connected to a REF line to which the reference voltage Vref is applied, and a second electrode connected to the second node DRG.

When the data voltage Vdata and the reference voltage Vref are applied to the pixel circuit via the data line DL, the number of transitions applied to the data line DL may be increased. Accordingly, the frequency may be increased and the power consumption of the display apparatus may be increased.

In contrast, in the embodiment, since the data line DL to which the data voltage Vdata is applied and the REF line to which the reference voltage Vref is applied are separated, the frequency of the voltage applied to the data line DL is lowered, thereby reducing power consumption.

The third switch element M3 may be turned on according to the gate-on voltage VGH of the third scan pulse SC3 to apply an initialization voltage Vinit to the third node DRS in the initialization phase INIT. The third switch element M3 may include a gate electrode connected to a third gate line to which the third scan pulse SC3 is applied, a first electrode connected to the fourth node n4, and a second electrode connected to an INIT line to which the initialization voltage Vinit is applied.

The fourth switch element M4 may be turned off according to the gate-off voltage VEL of the first EM pulse EM1 to block a current path between the VDD line to which the pixel driving voltage ELVDD is applied and the first node DRD in the initialization phase INIT and the addressing phase WR. The fourth switch element M4 may be turned on according to the gate-on voltage VEH of the first EM pulse EM1 to connect the VDD line to the first node DRD in the sampling phase SMPL and the emission phase EMIS. The fourth switch element M4 may include a gate electrode connected to a fourth gate line to which the first EM pulse EM1 is applied, a first electrode connected to the VDD line, and a second electrode connected to the first node DRD.

The fifth switch element M5 may be turned off according to the gate-off voltage VEL of the second EM pulse EM2 to block a current path between the third node DRS and the fourth node n4 in the sampling phase SMPL and the addressing phase WR. The fifth switch element M5 may be turned on according to the gate-on voltage VEH of the second EM pulse EM2 to form a current path between the driving element DT and the light-emitting element EL in the initialization phase INIT and the emission phase EMIS. The fifth switch element M5 may include a gate electrode connected to a fifth gate line to which the second EM pulse EM2 is applied, a first electrode connected to the third node DRS, and a second electrode connected to the fourth node n4.

Figure 8:
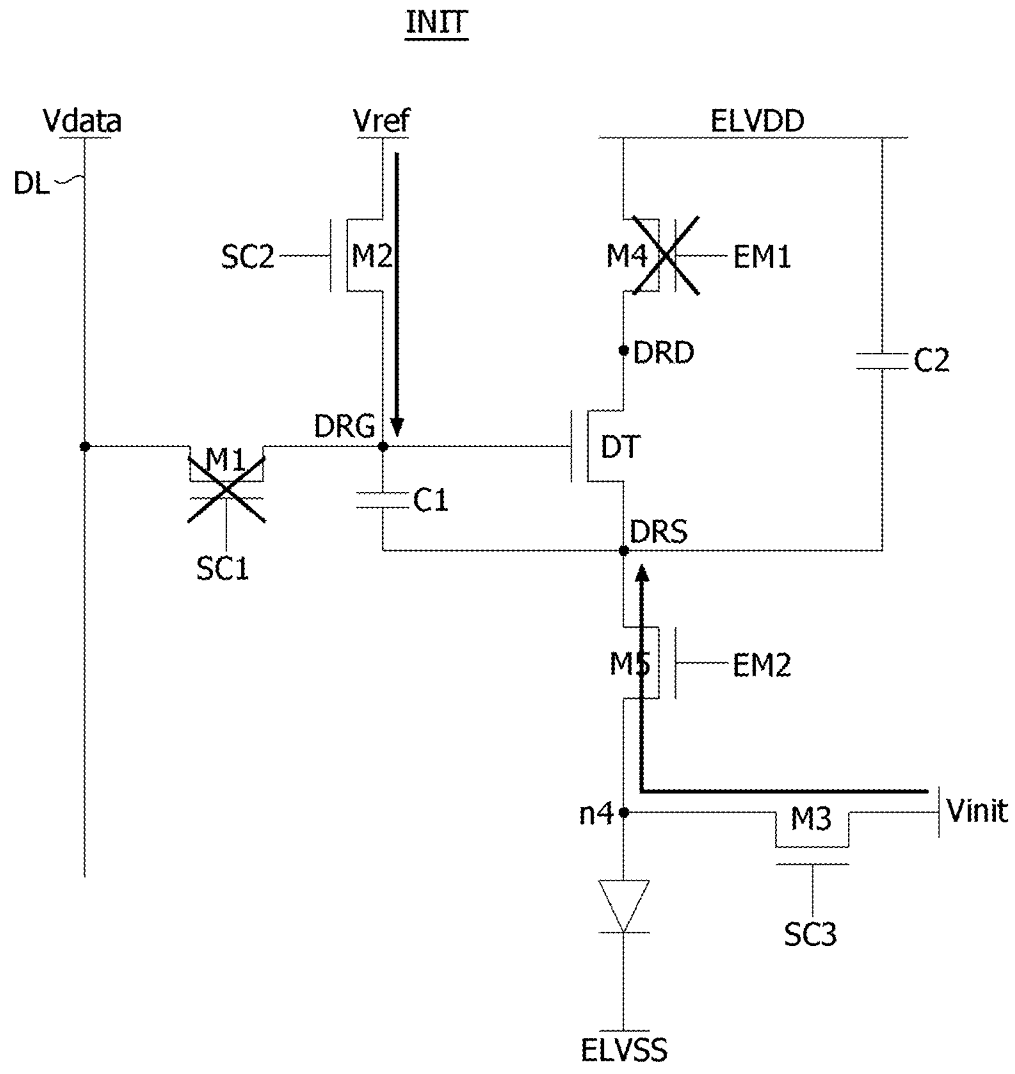
FIG. 8 is a diagram illustrating a current flowing in the pixel circuit according to FIG. 6 in an initialization phase.

FIG. 8 is a diagram illustrating a current flowing in the pixel circuit according to FIG. 6 in an initialization phase.

Referring to FIG. 8, in the initialization phase INIT, the second, third and fifth switch elements M2, M3 and M5 may be turned on. In the initialization phase INIT, the first and fourth switch elements M1 and M4 may be turned off. In the initialization phase INIT, the voltages of the main nodes are given by DRD=Vref+Vth, DRG=Vref, and DRS=Vinit. Here, 'Vth' is the threshold voltage of the driving element DT. Therefore, the driving element DT may be turned on because its gate-source voltage Vgs is Vref-Vinit greater than the threshold voltage Vth in the initialization phase INIT.

Figure 9:
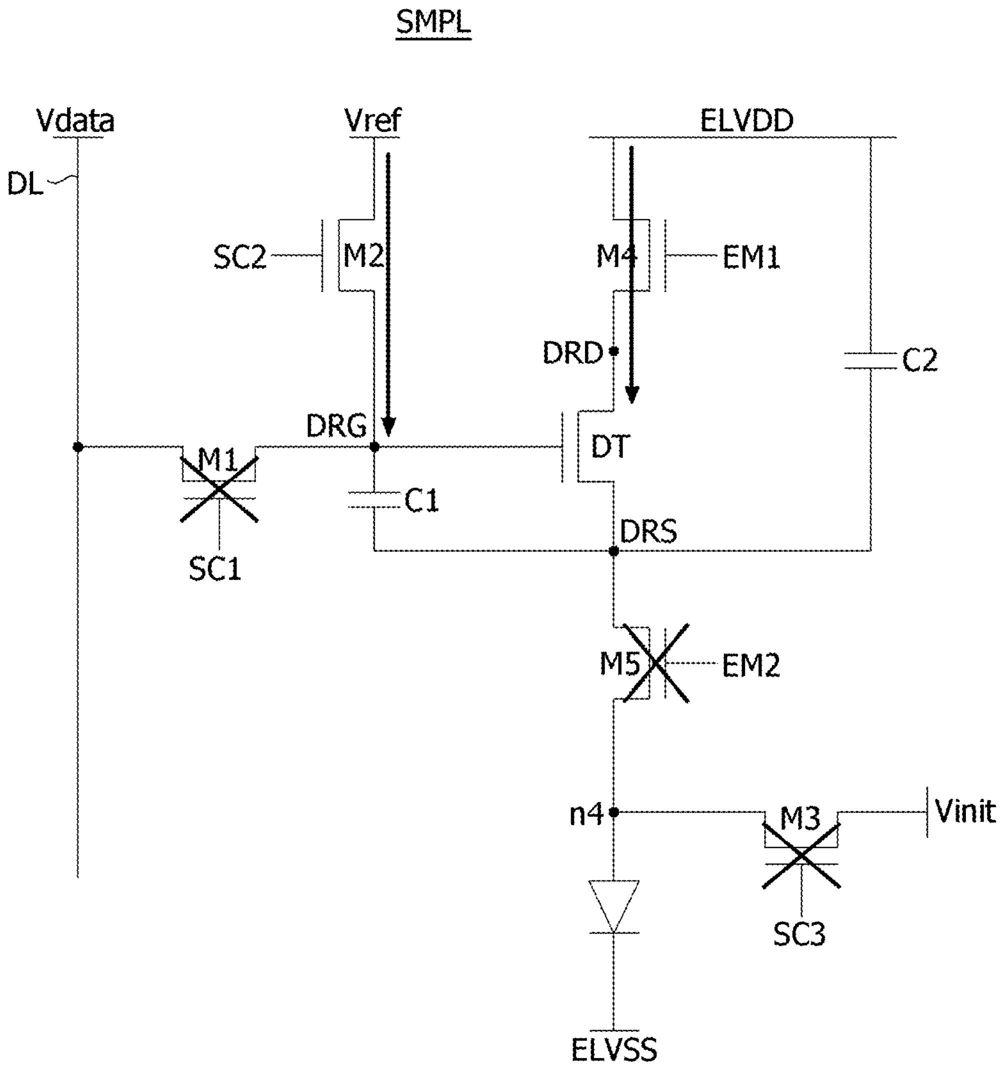
FIG. 9 is a diagram illustrating a current flowing in the pixel circuit according to FIG. 6 in a sampling phase.

FIG. 9 is a diagram illustrating a current flowing in the pixel circuit according to FIG. 6 in a sampling phase.

Referring to FIG. 9, in the sampling phase SMPL, the second and fourth switch elements M2 and M4 may be turned on, while the other switch elements M1, M3, and M5 may be turned off. In the sampling phase SMPL, when the voltage of the third node DRS increases and the gate-source voltage Vgs of the driving element DT reaches the threshold voltage Vth, the driving element DT may be turned off. At the end of the sampling phase SMPL, the voltages of the main nodes are given by DRD=ELVDD, DRG=Vref, and DRS=Vref−Vth. Therefore, at the end of the sampling phase SMPL, the gate-to-source voltage Vgs of the driving element DT is Vgs=Vth. The threshold voltage Vth of the driving element DT sampled in this way may be charged to the first capacitor C1.

Figure 10:
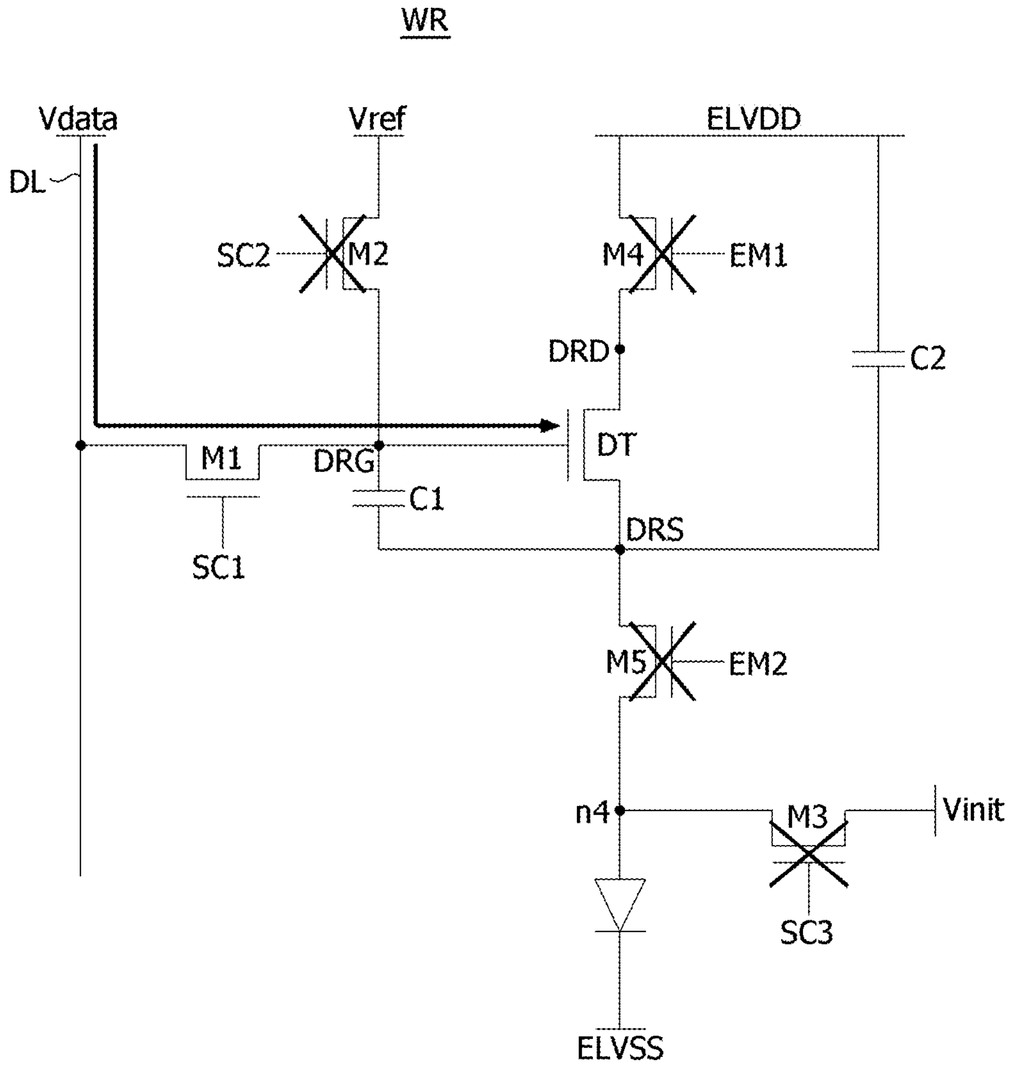
FIG. 10 is a diagram illustrating a current flowing in the pixel circuit according to FIG. 6 in an addressing phase.

FIG. 10 is a diagram illustrating a current flowing in the pixel circuit according to FIG. 6 in an addressing phase.

Referring to FIG. 10, in the addressing phase WR, the first switch element M1 may be turned on so that the data voltage Vdata of the pixel data may be applied to the second node DRG. In this case, the other switch elements M2, M3, M4, and M5 may be turned off. At the end of the addressing phase WR, the voltages of the main nodes are changed as DRD=ELVDD, DRG=Vdata, and DRS=Vref−Vth+C'X (Vdata−Vref). Here, C'=C1/(1+C2). The gate-source voltage Vgs of the driving element DT in the addressing phase WR is changed as Vgs=(1−C')×(Vdata−Vref)+Vth.

In the sampling phase SMPL and the addressing phase WR, the third node DRS may be electrically separated from the fourth node n4. As a result, the threshold voltage sampling and data addressing of the driving element DT are not affected by the resistance of the light-emitting element EL and the process deviation of the light-emitting element EL, so the influence of the light-emitting element EL on the luminance of the pixel may be excluded.

Figure 11:
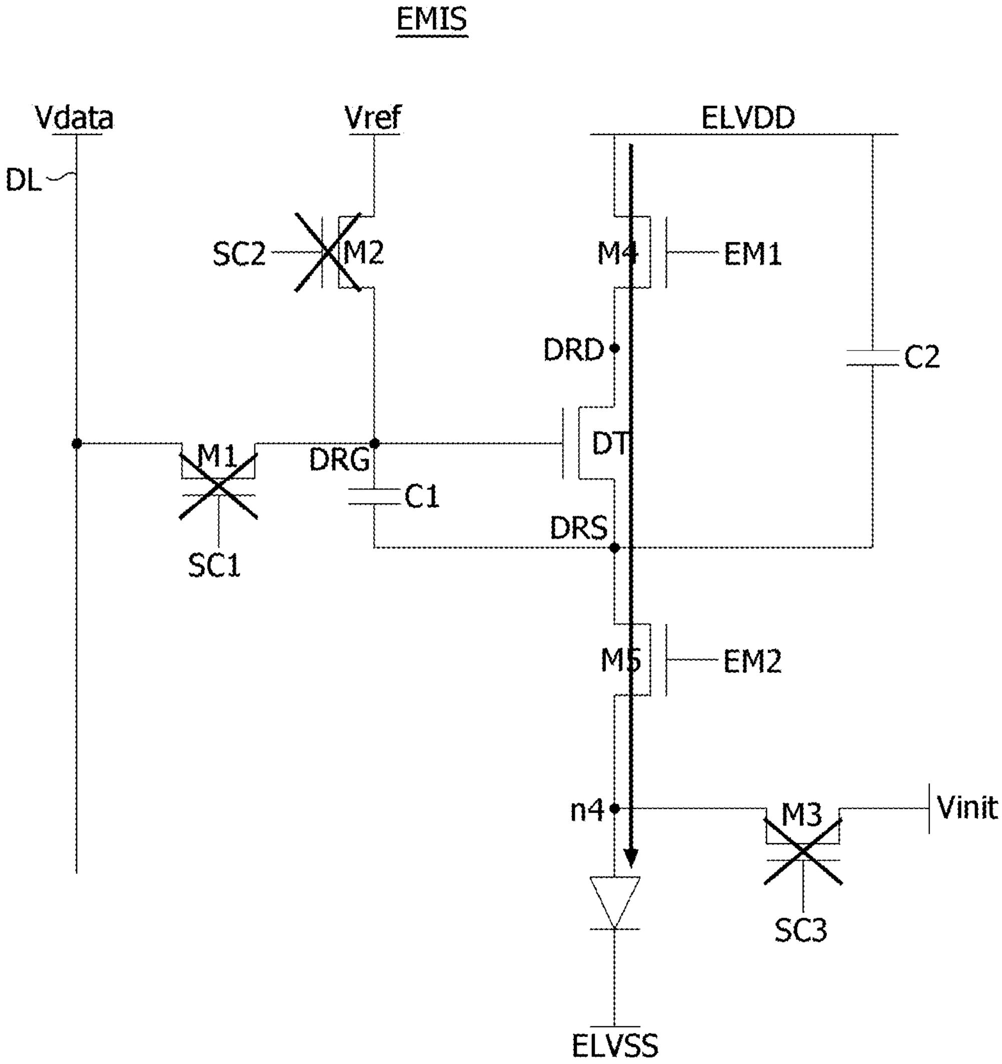
FIG. 11 is a diagram illustrating a current flowing in the pixel circuit according to FIG. 10 in an emission phase.

FIG. 11 is a diagram illustrating a current flowing in the pixel circuit according to FIG. 6 in an emission phase.

Referring to FIG. 11, in the emission phase EMIS, the fourth and fifth switch elements M4 and M5 may be turned on, while the other switch elements M1, M2, and M3 may be turned off. In the emission phase EMIS, the voltages of the main nodes are changed as follows: DRD=ELVDD, DRG=Vdata, and DRS=Vref−Vth+C'×(Vdata−Vref). In the emission phase EMIS, the voltage of the third node DRS is equal to the anode voltage Vel of the light-emitting element EL. The gate-source voltage Vgs of the driving element DT in the emission phase EMIS is given by Vgs=(1−C')×(Vdata−Vref)+Vth.

Figure 12:
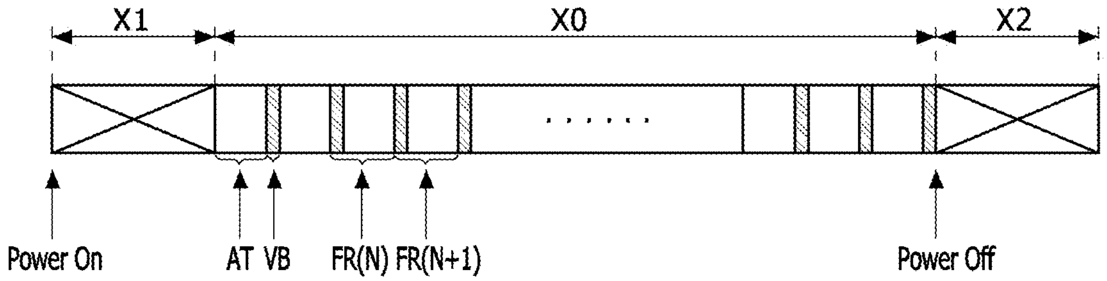
FIG. 12 is a diagram illustrating a driving period of the display apparatus.

FIG. 12 is a diagram illustrating a driving period of the display apparatus.

Referring to FIG. 12, the driving period of the display apparatus may include first and second non-display periods X1 and X2 and an image display period X0. The first non-display period X1 may be defined as an interval from power-on to the start of the first frame. The second non-display period X2 may be defined as an interval from power-off to power-on.

The image display period X0 may include an active interval AT in which data voltage is written to sub-pixels and a vertical blank interval VB in which image data is not written. The compensated period may be located outside the active interval AT. The compensated period may belong to the first and second non-display periods X1 and X2 or the vertical blank interval VB. During the compensated period, the data driver may extract a threshold voltage of the driving transistor and calculate a change amount of the threshold voltage based on the extracted threshold voltage to generate a compensated data voltage. The compensated period may include a programming period, a sensing period, a sampling period or the like.

The active interval AT may include an (N)th frame FR(N) and an (N+1)th frame FR(N+1) (N is a natural number greater than or equal to 1). The vertical blank interval VB may be located between the (N)th frame FR(N) and the (N+1)th frame FR(N+1).

The display apparatus according to an embodiment may control a time interval between power activation signals generated from a power control circuit based on a result sensed in the (N)th frame FR(N).

Figure 13:
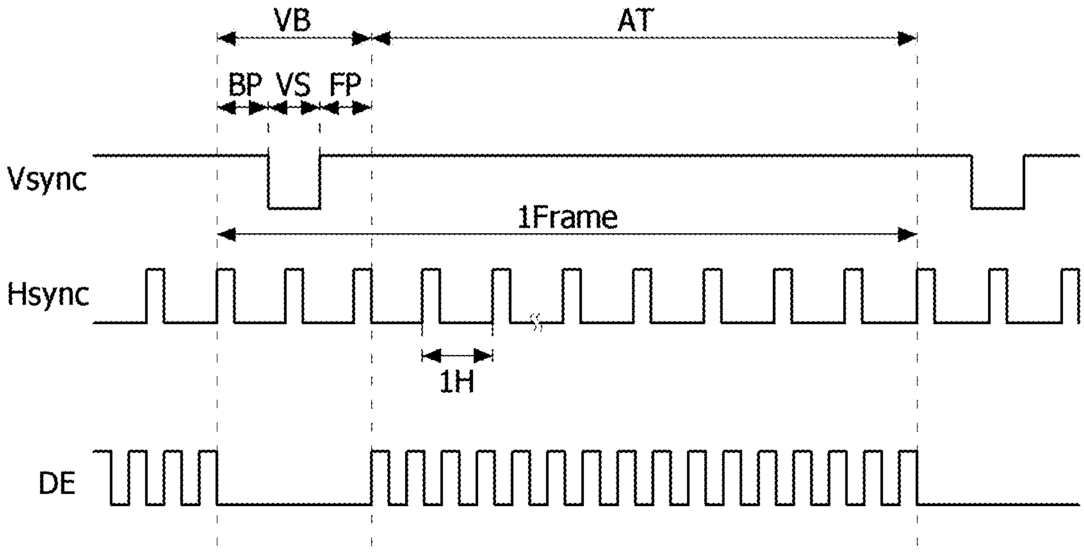
FIG. 13 is a waveform diagram illustrating a timing signal synchronized with an image signal.

FIG. 13 is a waveform diagram illustrating a timing signal synchronized with an image signal.

Referring to FIG. 13, a vertical synchronization signal Vsync may define one frame interval 1Frame. One frame interval 1Frame may be the sum of the active interval AT and the vertical blank interval VB. The vertical blank interval VB may be allocated as a predetermined time between the active interval AT of the (N)th frame interval and the active interval AT of the (N+1)th frame interval. A timing controller may receive a data enable signal DE and data of an input image during the active interval AT. The data enable signal DE and the data of the input image data may not exist in the vertical blanking interval VB. During the active interval AT, an amount of one frame of data to be written to the pixels may be received by the control circuit.

The horizontal synchronization signal Hsync may define one horizontal period (1 horizontal time, 1H). The data enable signal DE may define a valid pixel data interval in synchronization with the pixel data to be displayed on the display panel. One pulse cycle of the data enable signal DE is one horizontal period 1H, and a high logic interval of the data enable signal DE represents the pixel data input interval of one pixel line. One Horizontal period 1H is the time required to write data to the pixels of 1 pixel line on the display panel. The pixel line may be is arranged along a gate line direction and may include pixels connected to the same gate line. The pixels of one pixel line share a gate line to which a gate signal or scan signal is applied, so that they may be addressed simultaneously according to the scan signal to receive a data voltage of pixel data.

As may be seen from the data enable signal DE, the input data may not be received by the display during the vertical blank interval VB. The vertical blank interval VB may include a vertical sync time VS, a vertical front porch FP, and a vertical back porch BP.

Figure 14:
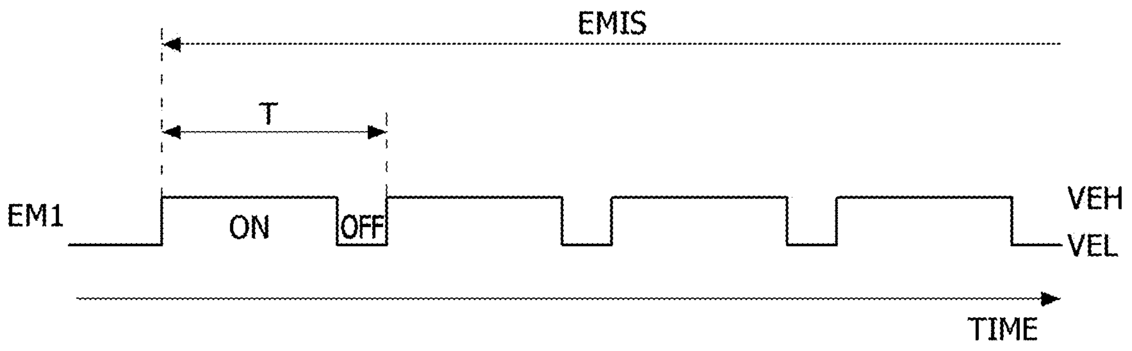
FIG. 14 is a waveform diagram illustrating a method of driving a first EM pulse in a emission phase.
Figure 15:
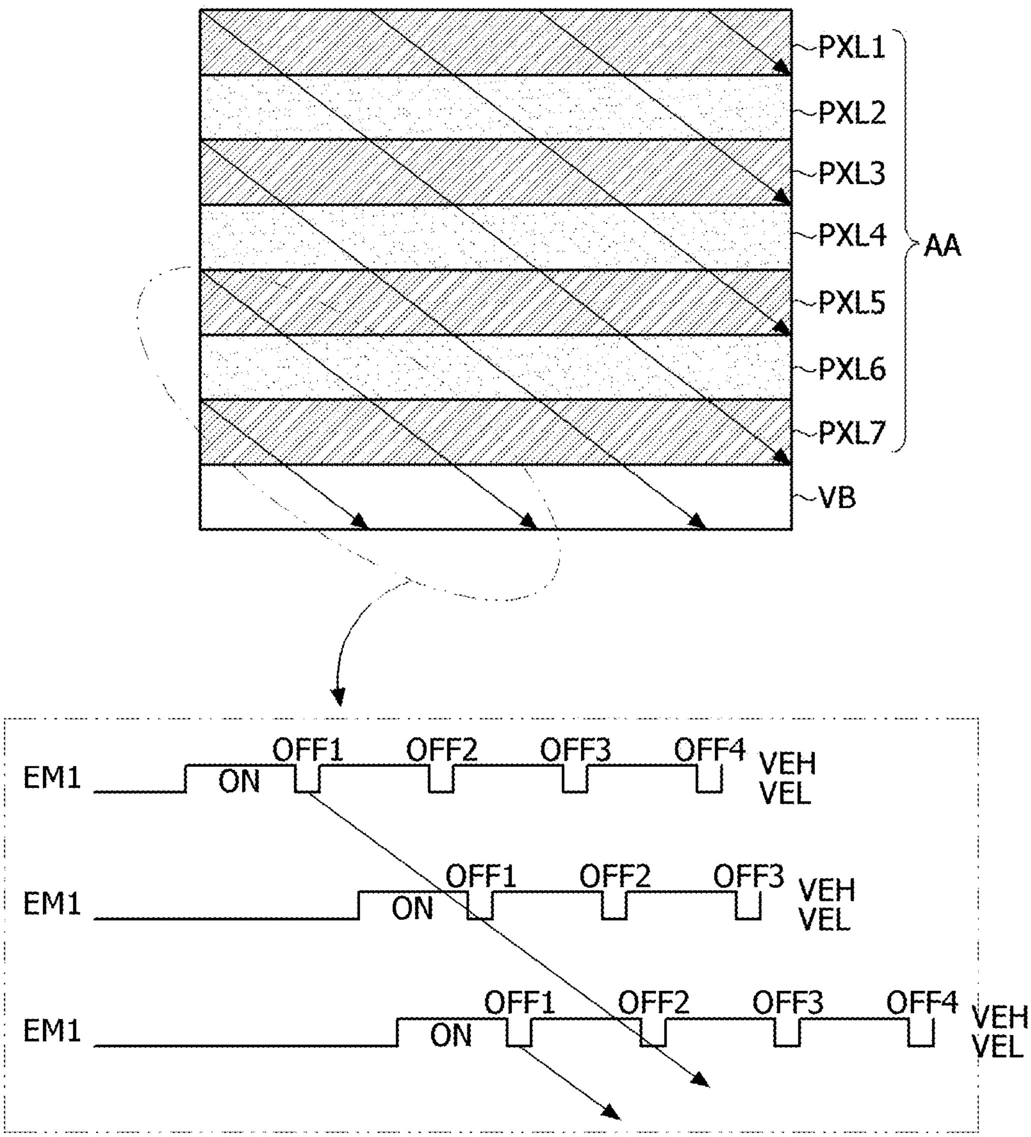
FIGS. 15 and 16 are diagrams for explaining the mura occurring in a display apparatus.
Figure 16:
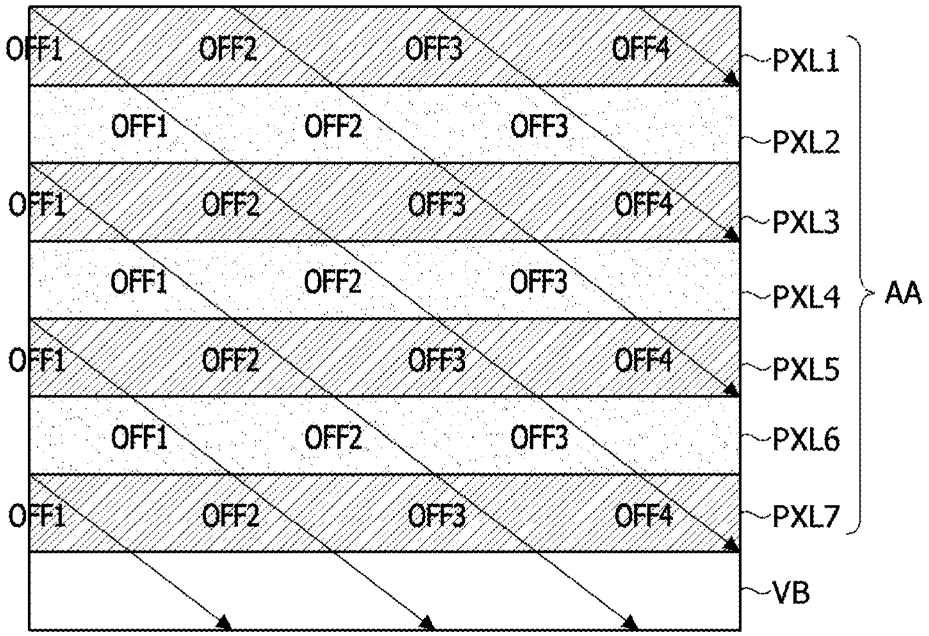
Figure 17:
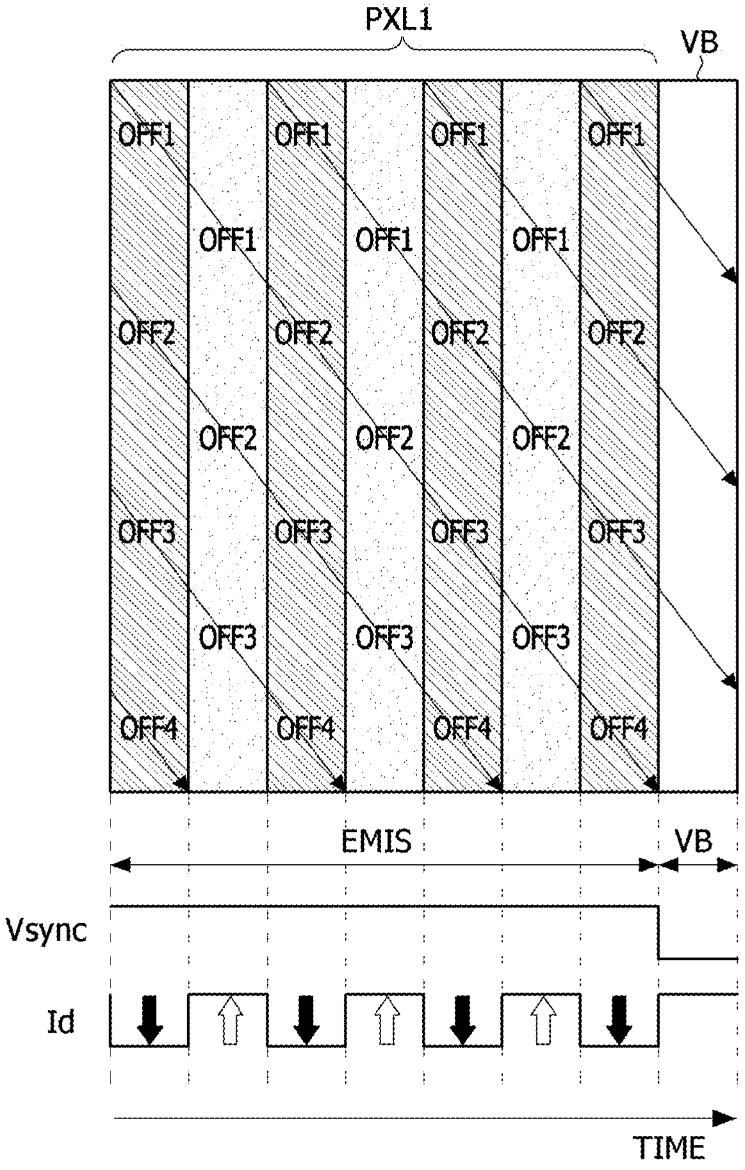
FIG. 17 is a diagram illustrating a change in a driving current of one pixel line over time.

FIG. 14 is a waveform diagram illustrating a method of driving a first EM pulse in an emission phase. FIGS. 15 and 16 are diagrams for explaining the mura occurring in a display apparatus. FIG. 17 is a diagram illustrating a change in a driving current of one pixel line over time.

Referring to FIG. 14, in the emission phase EMIS, the turn-on time at which the gate-on voltage ON of the first EM pulse EM1 is applied may be controlled. In some embodiments, the first EM pulse EM1 may not be generated only by the gate-on voltage ON in the emission phase EMIS. In another embodiments, the first EM pulse EM1 may be generated by repeating a cycle T including the gate-on voltage ON and the gate-off voltage OFF in the emission phase EMIS. This driving method may be referred to as a pulse width modulation (PWM) driving.

According to PWM driving, the switch element to which the first EM pulse EM1 is applied during the emission phase EMIS may repeat a turn-on state and a turn-off state. In one embodiment, a switch element to which a first EM pulse EM1 is applied may have a cycle T that includes a turn-on state and a turn-off state.

During the PWM driving, the luminance may be variously controlled by adjusting the turn-on and turn-off time ratio of the switch element to which the first EM pulse EM1 is applied, while maintaining the same data voltage. Depending on this ratio, the luminance of the pixel may be varied.

Referring to FIGS. 15 and 16, the display apparatus may include a display area AA. For illustrative purposes, it is assumed that the display area AA according to the embodiment of the present specification includes the first pixel line to the seventh pixel line PXL1 to PXL7. However, the embodiments of the present specification are not limited thereto, and the number of pixel lines is not limited as described below. A “VB” symbol refers to a vertical blank interval on the time axis, which is shown for better of understanding.

The pixels on a single pixel line may share a gate line to which a gate signal or scan signal is applied. Assuming the emission phase, the first EM pulse EM1 may be applied simultaneously to pixels in the same pixel line. Accordingly, all pixels in the same pixel line may be turned on simultaneously according to the gate-on voltage ON, or turned off according to the gate-off voltage OFF.

The gate-on voltage ON and the gate-off voltage OFF may be sequentially applied to each of the illustrated plurality of pixel lines PXL1 to PXL7.

For example, in the emission phase, four gate-off voltages OFF1, OFF2, OFF3, and OFF4 may be applied to the fifth pixel line PXL5. In the emission phase, three gate-off voltages OFF1, OFF2, and OFF3 may be applied to the sixth pixel line PXL6. In the emission phase, four gate-off voltages OFF1, OFF2, OFF3, and OFF4 may be applied to the seventh pixel line PXL7.

The gate driver which applies a gate signal including the first EM pulse EM1 to the pixel circuit may include a shift register. The shift register may include a plurality of stages connected in a cascade manner. Depending on the operational sequence of the dependently connected stages, the first gate-off voltage OFF1 may be applied to the sixth pixel line PXL6 after the first gate-off voltage OFF1 is applied to the fifth pixel line PXL5. After the first gate-off voltage OFF1 is applied to the sixth pixel line PXL6, the second gate-off voltage OFF2 may be applied to the seventh pixel line PXL7.

Since the four gate-off voltages OFF1, OFF2, OFF3, and OFF4 are applied to the seventh pixel line PXL7, the first gate-off voltage OFF1 may be applied to the seventh pixel line PXL7 before the second gate-off voltage OFF2 is applied to the seventh pixel line PXL7.

The display area AA including the plurality of pixel lines PXL1 to PXL7 may include a first pixel line PXL1, a third pixel line PXL3, a fifth pixel line PXL5, and a seventh pixel line PXL7 to which four gate-off voltages OFF1, OFF2, OFF3, and OFF4 are applied.

The display area AA may include the second pixel line PXL2, the fourth pixel line PXL4, and the sixth pixel line PXL6 to which three gate-off voltages OFF1, OFF2, and OFF3 are applied.

For example, within any one frame interval, four gate-off voltages OFF1, OFF2, OFF3, and OFF4 may be applied to some pixel lines PXL1, PXL3, PXL5, and PXL7, and three gate-off voltages OFF1, OFF2, and OFF3 may be applied to other pixel lines PXL2, PXL4, and PXL6.

When the fourth switch element M4 is PWM-driven through the first EM pulse EM1 in the emission phase, there may be a temporal deviation between the gate-off voltages OFF applied to the pixel lines arranged in the scan direction due to sequential driving between the stages.

Accordingly, there may be a difference in the number of gate-off voltages OFF of the “first EM pulse EM1 applied during the emission phase within any one frame interval” among the plurality of pixel lines PXL1 to PXL7 arranged in the scan direction.

As described above, in the PWM driving, when the turn-on and turn-off time ratio of the switch elements to which the first EM pulse EM1 is applied is adjusted, this adjustment may cause changes in luminance of the plurality of pixel lines PXL1 to PXL7, which may result in the luminance deviations between the plurality of pixel lines PXL1 to PXL7. For example, such luminance deviation may manifest as the mura in the display apparatus. For example, this luminance deviation may be referred to as the HBM (Horizontal Band Mura) phenomenon.

Referring to FIG. 17, for example, the first EM pulse applied to the first pixel line PXL1 may have the number of gate-off voltages that changes over time. For example, in the emission phase, the first pixel line PXL1 may have four gate-off voltages OFF1, OFF2, OFF3, and OFF4 at one time point and three gate-off voltages OFF1, OFF2, and OFF3 at another.

Differences in the number and/or ratio of the gate-off voltages OFF that occur due to the PWM driving in the emission phase may occur over time, which may affect the driving current Id flowing to the driving element.

For example, at a time point when the number of the gate-off voltages is four, that is, the gate-off voltages OFF1, OFF2, OFF3, and OFF4, in the emission phase, a relatively low driving current Id may flow to the driving element. For example, at a time point when the number of the gate-off voltages is three, that is, gate-off voltages OFF1, OFF2, and OFF3, in the emission phase, a relatively high driving current Id may flow to the driving element.

Due to the variation in the number of the gate-off voltages, the driving current Id may change over time. For example, a relatively high value current and a relatively low value current may flow alternately.

Figure 18:
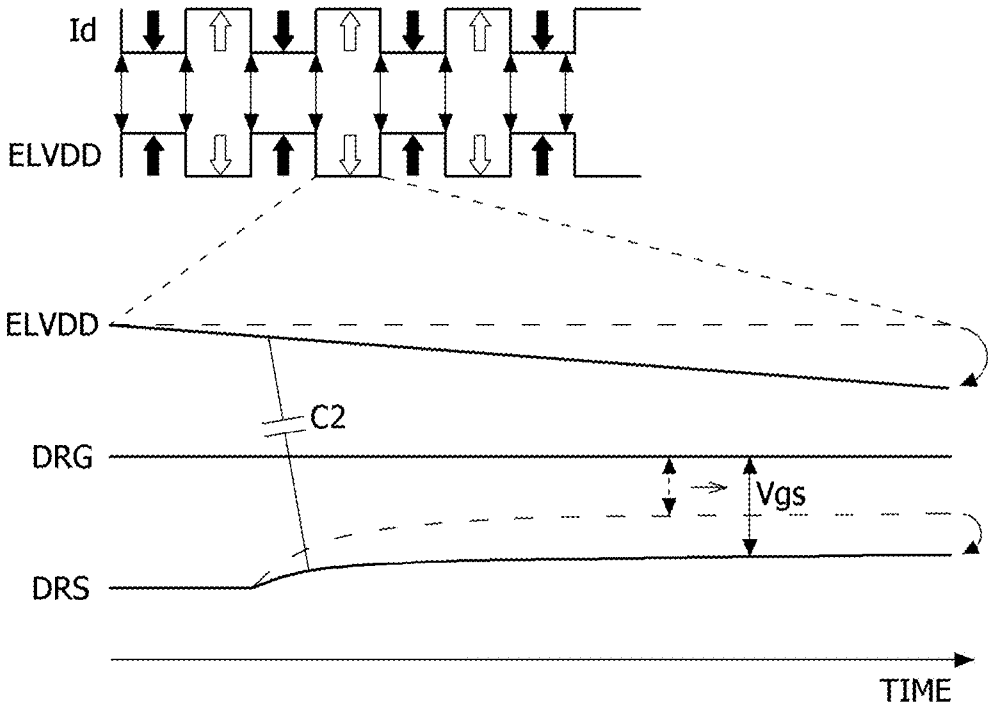
FIG. 18 is a diagram illustrating changes in a pixel driving voltage and a gate-source voltage over time.
Figure 19:
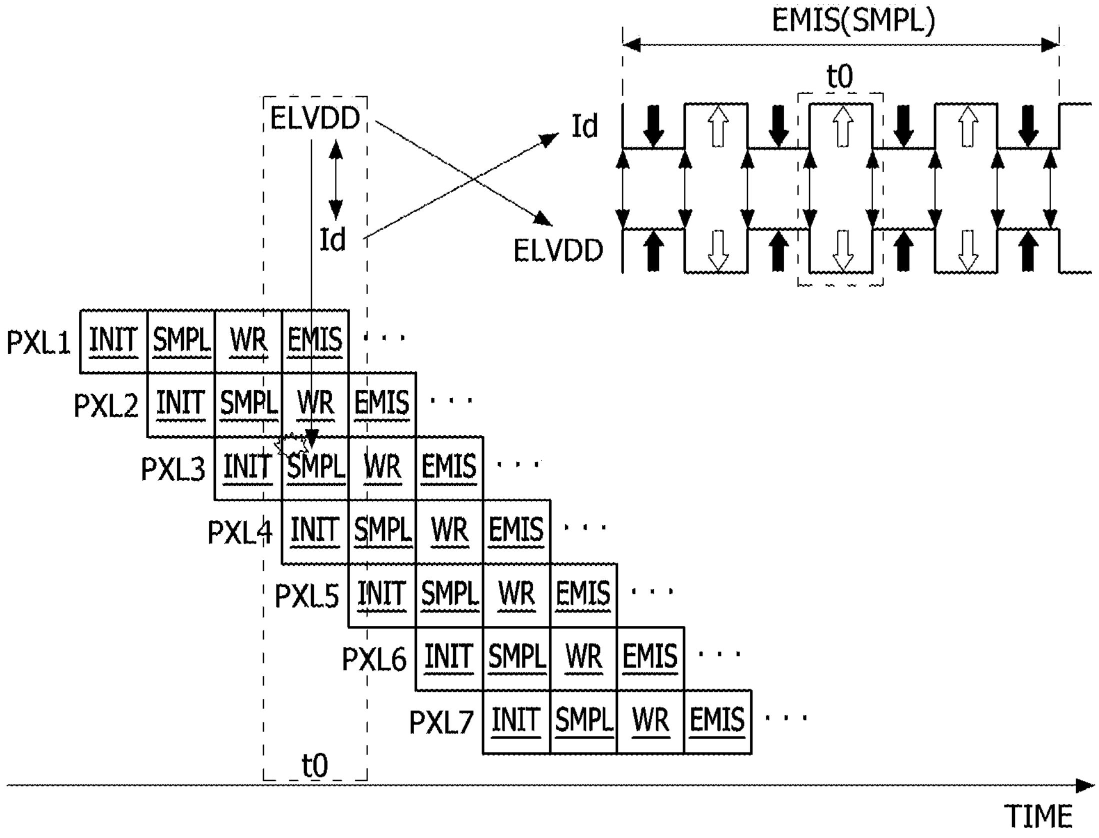
FIG. 19 is a diagram explaining sampling error.
Figure 20:
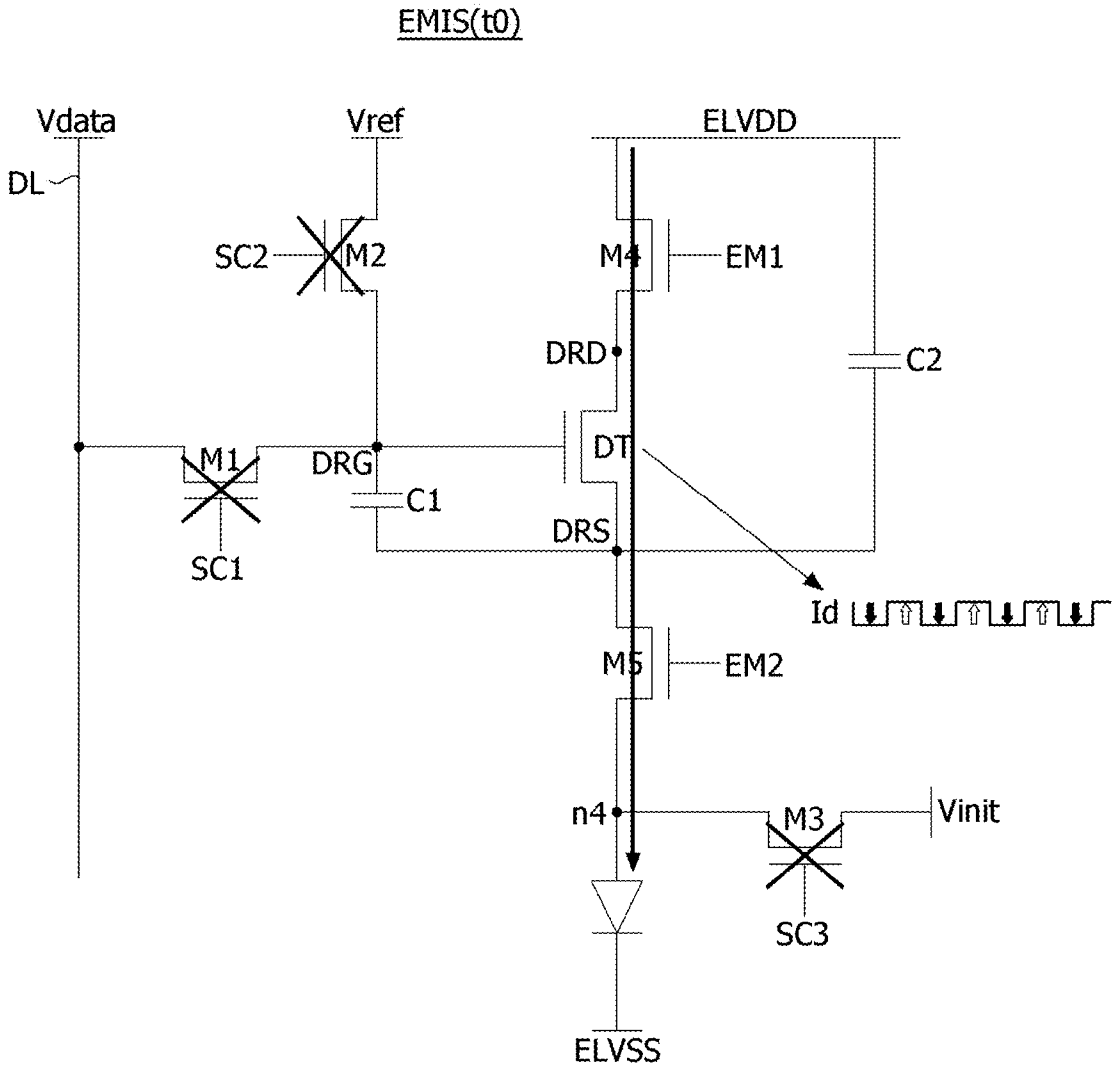
FIG. 20 is a circuit diagram illustrating a pixel in which an emission phase is performed at a specific time.
Figure 21:
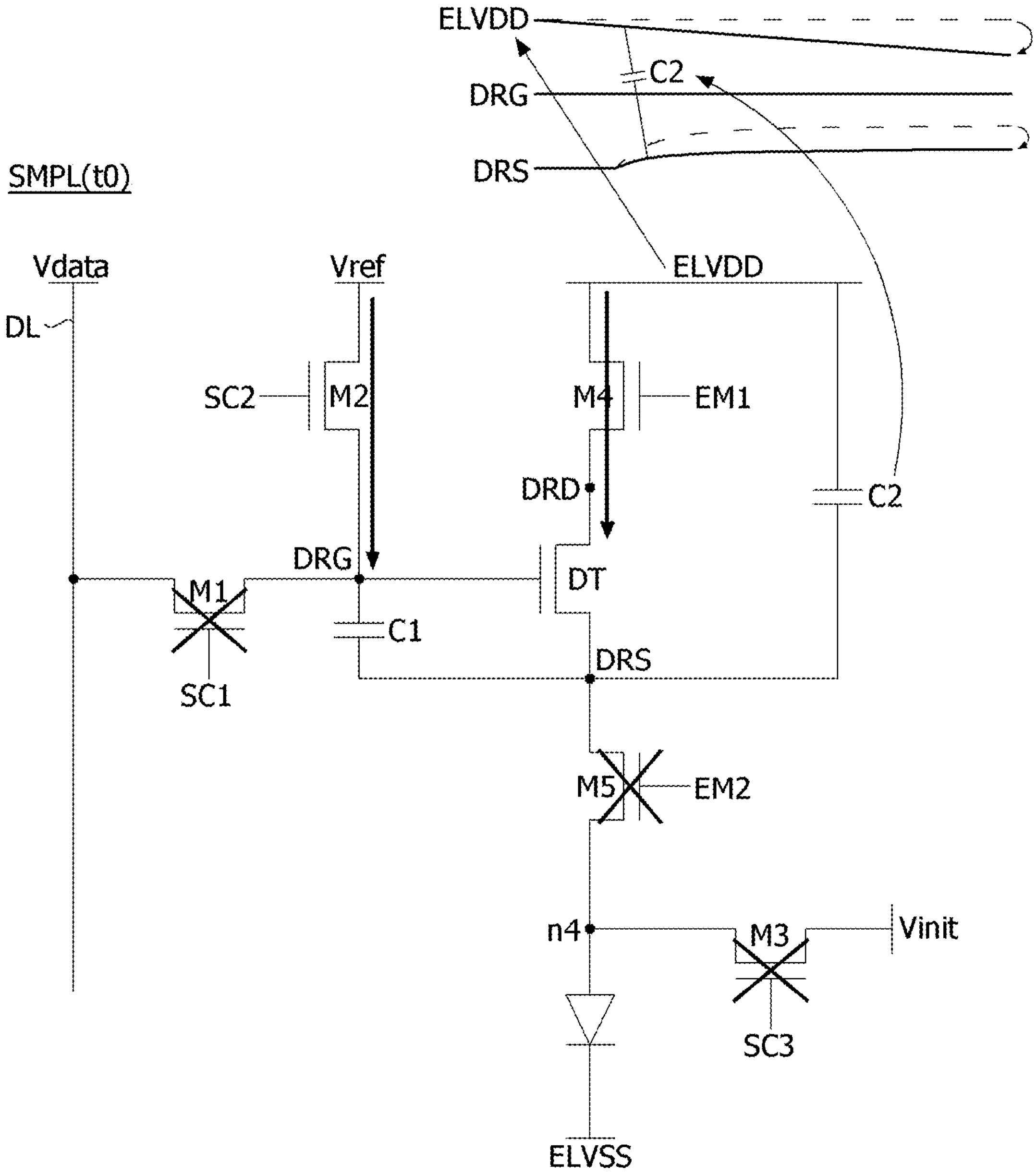
FIG. 21 is a circuit diagram illustrating a pixel in which a sampling phase is performed at a specific time.

FIG. 18 is a diagram illustrating the changes in a pixel driving voltage and a gate-source voltage over time. FIG. 19 is a diagram illustrating sampling error. FIG. 20 is a circuit diagram illustrating a pixel in which an emission phase is performed at a specific time. FIG. 21 is a circuit diagram illustrating a pixel in which a sampling phase is performed at a specific time.

Referring to FIG. 18, the pixel driving voltage ELVDD may be changed when the driving current Id applied to the pixel circuit repeatedly rise and fall. The pixel driving voltage ELVDD may be a high potential voltage, which may be a constant voltage supplied across the display area.

For example, since an increase in the driving current Id means that the driving element is carrying a relatively large amount of current, a relatively large amount of current may be consumed in the pixel driving voltage ELVDD. This may cause the pixel driving voltage ELVDD to decrease.

For example, since a decrease in the driving current Id means that the driving element is carrying a relatively small amount of current, a relatively small amount of current may be consumed in the pixel driving voltage ELVDD. This may cause the pixel driving voltage ELVDD may increase.

For example, the pixel driving voltage ELVDD may repeatedly fall and rise by the driving current Id that repeats the rise and fall.

Referring to the pixel circuit described above, the third node DRS located in the pixel circuit according to an embodiment of the present specification may be arranged between the VDD line to which the pixel driving voltage ELVDD is supplied and the second capacitor C2. In one embodiment, when the pixel driving voltage ELVDD decreases, the potential of the third node DRS may decrease by being coupled to the second capacitor C2. As a result, the gate-source voltage may have a relatively increased value.

Referring to FIG. 19, the pixel circuit arranged on the plurality of pixel lines PXL1 to PXL7 arranged in the display apparatus may be repeatedly performed an initialization phase INIT, a sampling phase SMPL, an addressing phase WR, and an emission phase EMIS during a driving step. In general, the initialization phase INIT, the sampling phase SMPL, the addressing phase WR, and the emission phase EMIS may be performed at least once in any one frame interval.

As described above, the gate driver that applies a gate signal including a scan signal and an emission control signal to each of the pixel lines PXL1 to PXL7 may include a shift register. The shift register may include a plurality of stages connected in cascade and may apply the gate signal in the scan direction. The gate signal may be applied to each line of pixels in sequence.

In one embodiment, one of the pixel lines PXL1 to PXL7 (e.g., a first pixel line PXL1) may be in the emission phase EMIS and another of the pixel lines PXL1 to PXL7 (e.g., a third pixel line PXL3) may be in the sampling phase SMPL.

By the gate signals applied sequentially over time to the plurality of pixel lines PXL1 to PXL7, the pixel lines PXL1 to PXL7 may be in progress in a different phase (e.g., any one of the initialization phase INIT, the sampling phase SMPL, the addressing phase WR, and the emission phase EMIS). For example, at the time to, while the emission phase EMIS is in progress on the first pixel line PXL1, the sampling phase SMPL may be in progress on the third pixel line PXL3.

In a method of driving the pixel circuit according to the embodiment of the present specification, the driving step of the pixel circuit in progress on the plurality of pixel lines PXL1 to PXL6 may be in a different phase (e.g., any one of the initialization phase INIT, the sampling phase SMPL, the addressing phase WR, and the emission phase EMIS).

For example, at a time to when the emission phase EMIS is in progress on the first pixel line PXL1, this emission phase EMIS may affect the pixel driving voltage ELVDD. The pixel driving voltage ELVDD may be a constant voltage commonly applied not only to the first pixel line PXL1 but also to the other pixel lines PXL2 to PXL7.

Since a different driving phase is in progress on each of the pixel lines PXL1 to PXL7, if the pixel driving voltage ELVDD is affected by any one pixel line (for example, the first pixel line PXL1), the affected pixel driving voltage ELVDD may be applied to another pixel line (for example, the third pixel line PXL3) on which the driving step is in progress, causing an error.

Referring to FIG. 20, in the driving of the pixel circuit, a difference in the number of gate-off voltages OFF may occur when any one pixel line (e.g., the first pixel line PXL1) in which the emission phase EMIS(t0) is in progress is driven at a specific time point t0. This may cause the driving current Id to rise and fall.

Referring to FIG. 21, this difference may affect the driving current Id, which in turn may affect the pixel driving voltage ELVDD based on the coupling mechanism of the second capacitor C2 as described above. The pixel driving voltage ELVDD may cause sampling errors on another pixel line (e.g., the third pixel line PXL3) where the sampling phase SMPL(t0) is in progress at the same time point t0. The errors may prevent the pixel circuit from working properly and cause luminance deviations, also known as HBM (Horizontal Band Mura) phenomenon.

An embodiment of the present specification may address the aforementioned driving problems in pixel circuits to overcome the HBM phenomenon.

Figure 22:
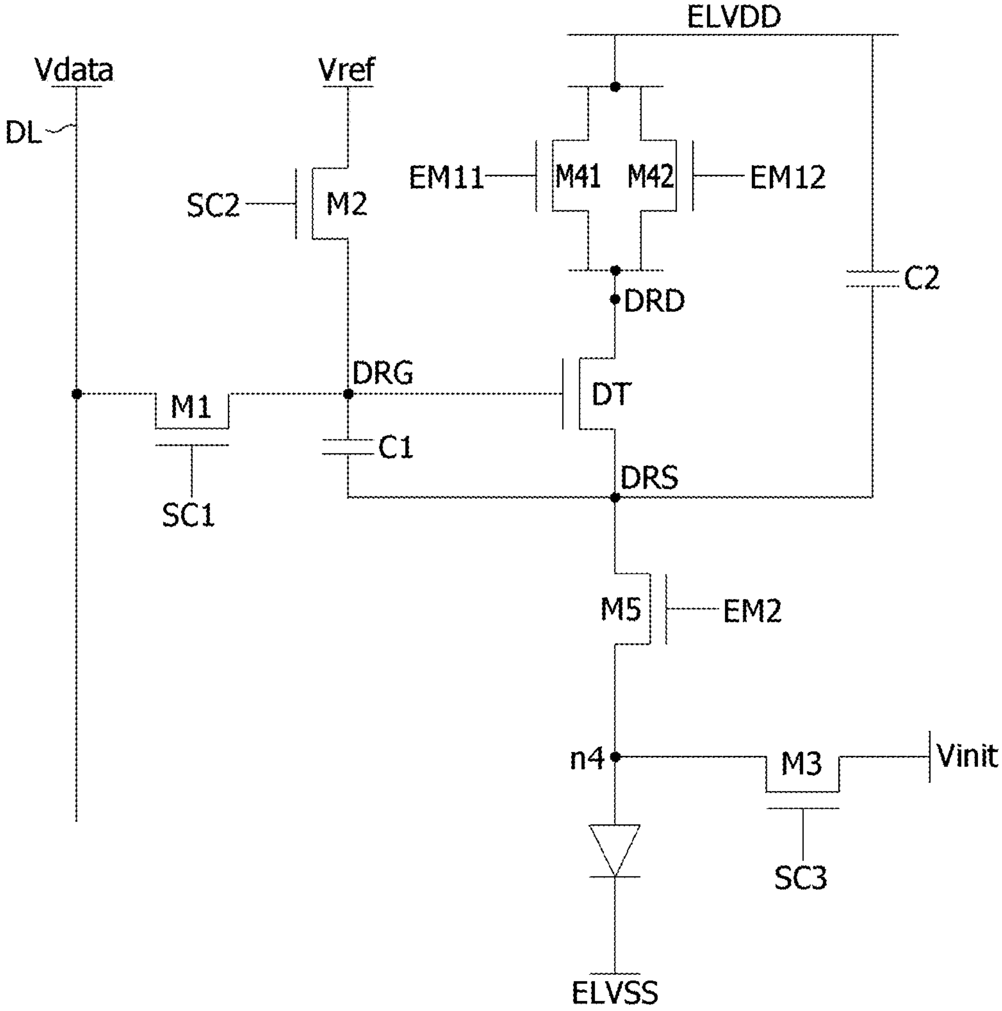
FIG. 22 is a circuit diagram illustrating a pixel circuit according to a first embodiment of the present specification.
Figure 23:
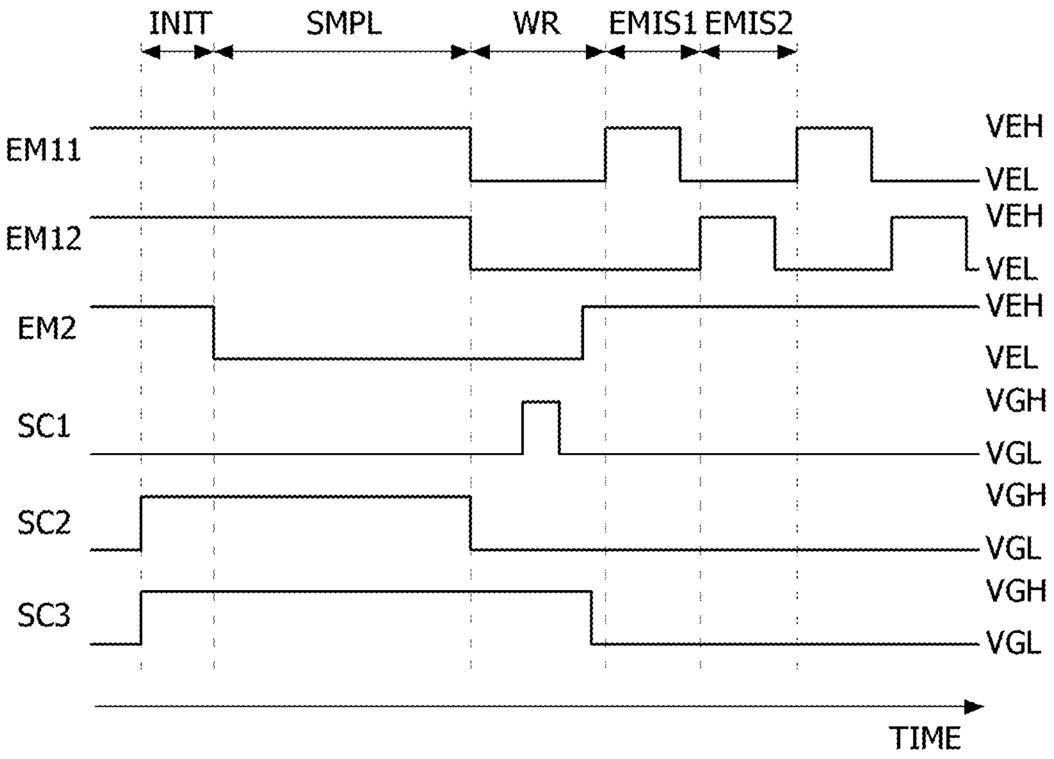
FIG. 23 is a waveform diagram illustrating a method of driving the pixel circuit according to the first embodiment of the present specification.

FIG. 22 is a circuit diagram illustrating a pixel circuit according to a first embodiment of the present specification. FIG. 23 is a waveform diagram illustrating a method of driving the pixel circuit according to the first embodiment of the present specification. The same reference numerals are assigned to configurations that perform substantially the same function as the aforementioned pixel circuit, and repeated detailed descriptions are omitted.

Referring to FIGS. 22 and 23, the pixel circuit may include a light-emitting element EL, a driving element DT that supply a current to the light-emitting element EL, a plurality of switch elements M1 to M5, a first capacitor C1, and a second capacitor C2. The driving element DT and the switch elements M1, M2, M3, M41, M42, and M5 may be implemented as an n-channel transistor.

First EM pulses EM11 and EM12 and fourth switch elements M41 and M42 may be implemented in multiple. For example, the fourth switch elements M41 and M42 may include a fourth-first switch element M41 to which a first-first EM pulse EM11 is applied to its gate electrode and a fourth-second switch element M42 in which a first-second EM pulse EM12 is applied to its gate electrode.

In one embodiment, the emission phases EMIS1 and EMIS2 may be PWM driven.

Emission phases EMIS1 and EMIS2 may be implemented in multiple phases. The emission phases EMIS1 and EMIS2 may include a first emission phase EMIS1 in which a first-first EM pulse EM11 including a gate-on voltage VEH and a first-second EM pulse EM12 including only a gate-off voltage VEL are applied. The emission phases EMIS1 and EMIS2 may include a second emission phase EMIS2 in which a first-second EM pulse EM12 including a gate-on voltage VEH and a first-first EM pulse EM11 including only a gate-off voltage VEL are applied. During the driving step of the pixel circuit according to one embodiment, the first emission phase EMIS1 and the second emission phase EMIS2 may be alternately repeated.

The fourth switch element M4 may include a fourth-first switch element M41 that is turned on according to the gate-on voltage VEH of the first-first EM pulse EM11 in the first emission phase EMIS1 and turned off according to the gate-off voltage VEL of the first-first EM pulse EM11 in the second emission phase EMIS2.

The fourth-first switch element M41 may include a gate electrode to which a first-first EM pulse EM11 is applied, a first electrode connected to a VDD line to which the pixel driving voltage ELVDD is applied, and a second electrode connected to a first node DRD.

The fourth switch element M4 may include a fourth-second switch element M42 that is turned off according to the gate-off voltage VEL of the first-second EM pulses EM12 in the first emission phase EMIS1 and turned on according to the gate-on voltage VEH of the first-second EM pulses EM12 in the second emission phase EMIS2.

The fourth-second switch element M42 may include a gate electrode to which the first-second EM pulses EM12 is applied, a first electrode connected to the VDD line to which the pixel driving voltage ELVDD is applied, and a second electrode connected to the first node DRD.

Figure 24:
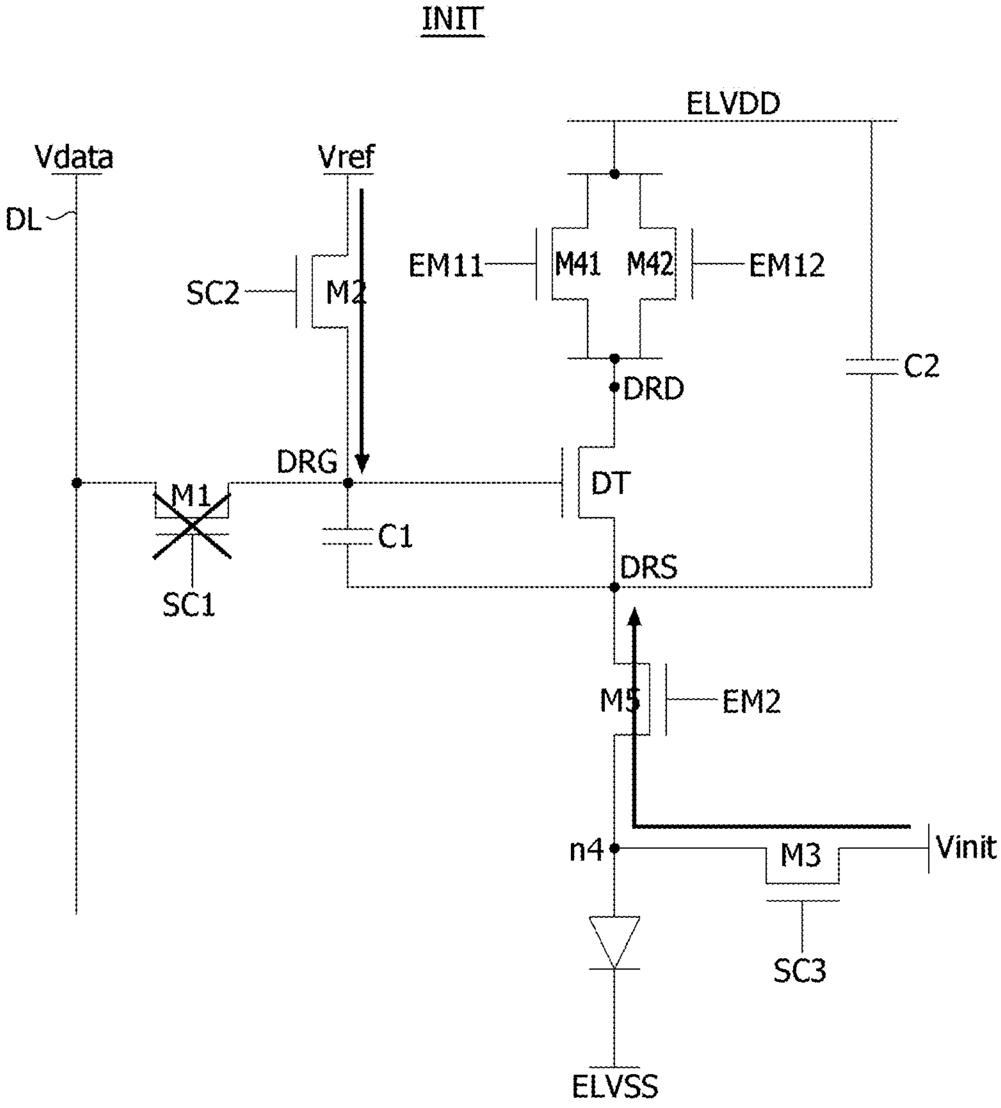
FIG. 24 is a diagram illustrating a current flowing in the pixel circuit according to the first embodiment in an initialization phase.
Figure 25:
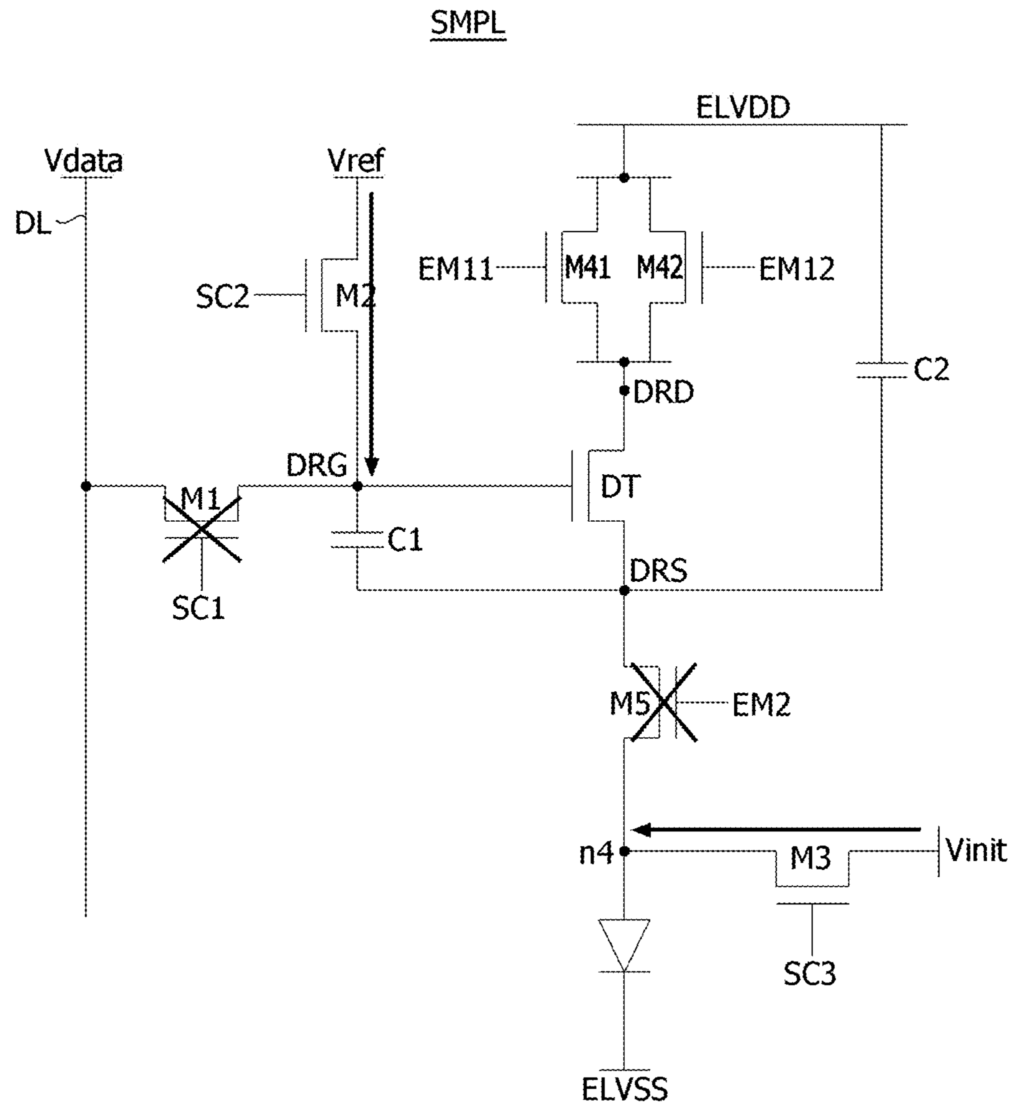
FIG. 25 is a diagram illustrating a current flowing in the pixel circuit according to the first embodiment in a sampling phase.
Figure 26:
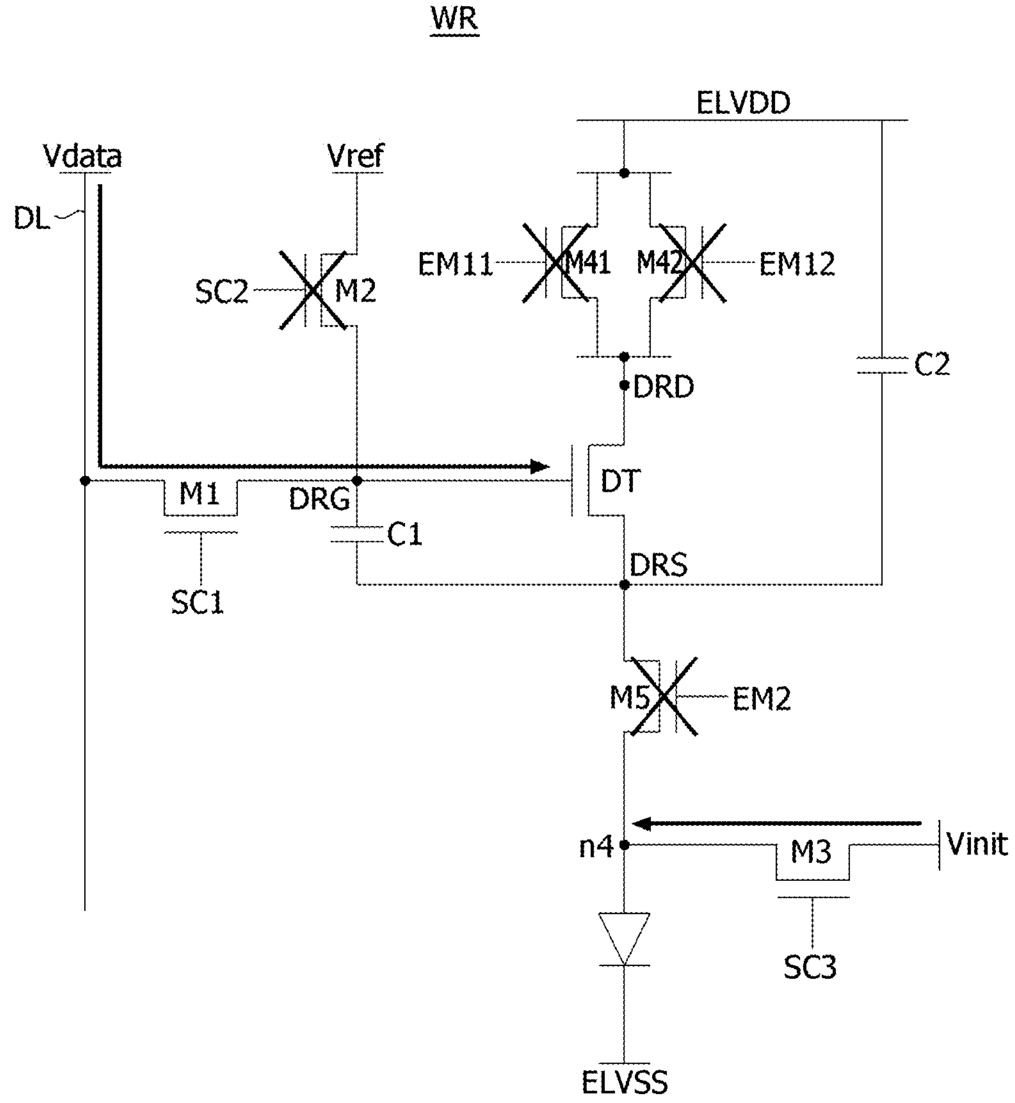
FIG. 26 is a diagram illustrating a current flowing in the pixel circuit according to the first embodiment in an addressing phase.
Figure 27:
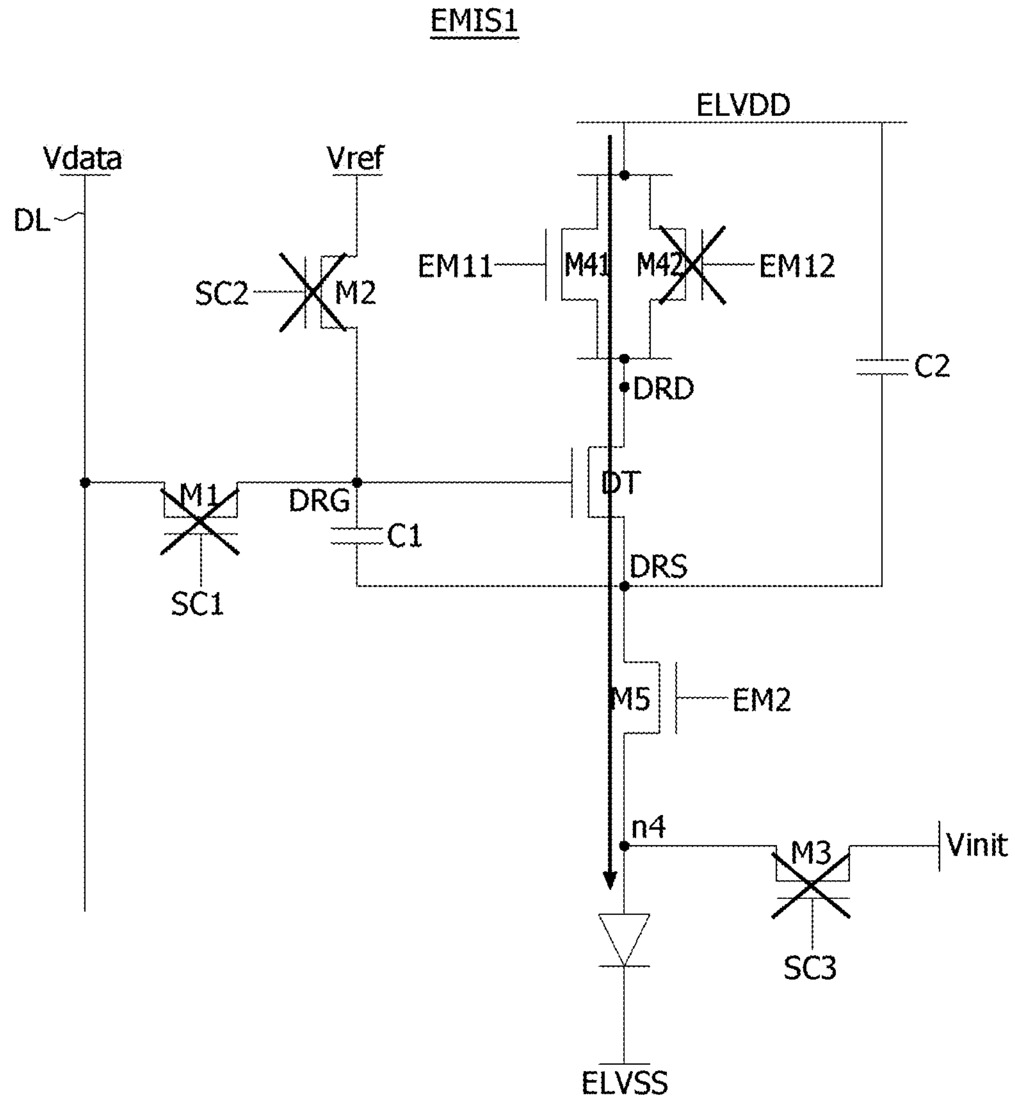
FIG. 27 is a diagram illustrating a current flowing in the pixel circuit according to the first embodiment in a first emission phase.
Figure 28:
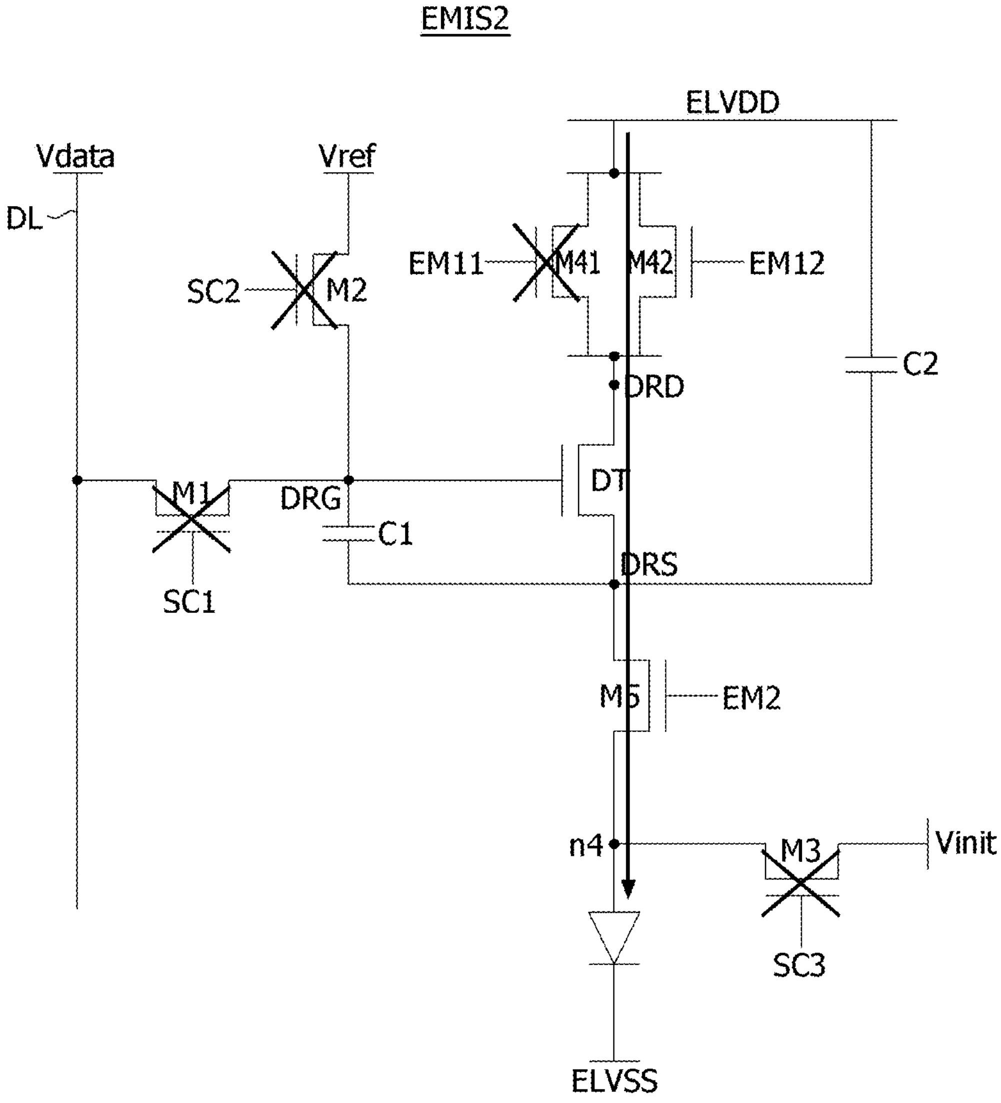
FIG. 28 is a diagram illustrating a current flowing in the pixel circuit according to the first embodiment in a second emission phase.

FIG. 24 is a diagram illustrating a current flowing in the pixel circuit according to the first embodiment during an initialization phase. FIG. 25 is a diagram illustrating a current flowing in the pixel circuit according to the first embodiment during a sampling phase. FIG. 26 is a diagram illustrating a current flowing in the pixel circuit according to the first embodiment an addressing phase. FIG. 27 is a diagram illustrating a current flowing in the pixel circuit according to the first embodiment in a first emission phase. FIG. 28 is a diagram illustrating a current flowing in the pixel circuit according to the first embodiment during a second emission phase.

Referring to FIG. 24, in the initialization phase INIT, second, third, fourth-first, fourth-second, and fifth switch elements M2, M3, M41, M42, and M5 may be turned on.

Referring to FIG. 25, in the sampling phase SMPL, the second, fourth-first and fourth-second switch elements M2, M41, and M42 may be turned on, while the other switch elements M1, M3, and M5 may be turned off.

Referring to FIG. 26, in the addressing phase WR, the first switch element M1 is turned on so that the data voltage Vdata of the pixel data may be applied to a second node DRG. The fourth-first and fourth-second switch elements M41 and M42 may be turned off.

Referring to FIG. 27, in the first light emitting stage EMIS1, the fourth-first and fifth switch elements M41 and M5 may be turned on, while the other switch elements M1, M2, M3, and M42 may be turned off.

Referring to FIG. 28, in the second emission phase EMIS2, the fourth-second and fifth switch elements M42, and M5 may be turned on, while the other switch elements M1, M2, M3, and M41 are turned off.

Figure 29:
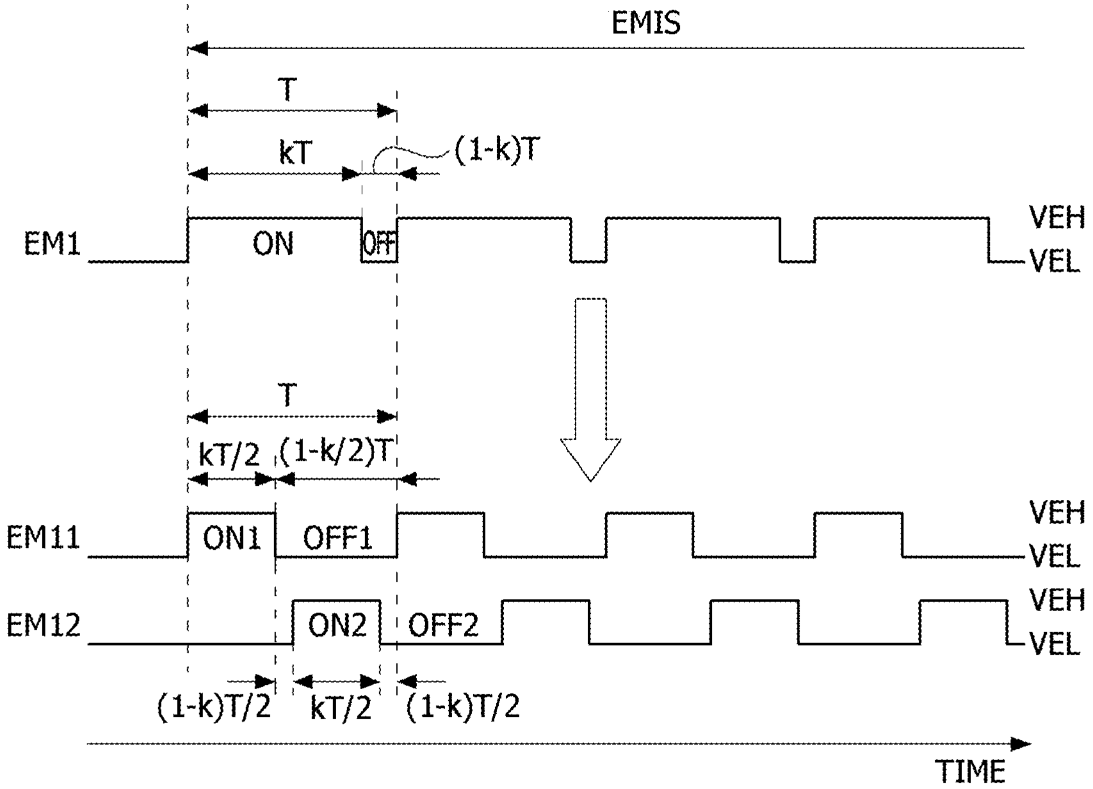
FIG. 29 is a waveform diagram explaining a period of a first EM pulse.

FIG. 29 is a waveform diagram to illustrate the period of the first EM pulse.

Referring to FIG. 29, in the case of PWM driving through the first EM pulse EM1 in the emission phase EMIS, the luminance may be varied by adjusting the ratio of the turn-on and turn-off times of the switch element to which the first EM pulse EM1 is applied as described above. Depending on this ratio, the luminance of the pixel may vary.

When the first EM pulse EM1 is divided into the first-first EM pulse EM11 and the first-second EM pulse EM12 to adjust the difference in the number of gate-off voltages OFF, the luminance of the pixel may vary depending on the turn-on or turn-off times of the switch elements to which the EM pulses EM11 and EM12 are applied.

In one embodiment, the period T of the first-first EM pulse EM11 may be substantially the same as the period T of the first EM pulse EM1. The period T of the first-second EM pulse EM12 may be substantially the same as the period T of the first EM pulse EM1.

In the period T, the first-first EM pulse EM11 may be driven as a first gate-on voltage ON1 and a first gate-off voltage OFF1. In the period T, the first-second EM pulses EM12 may be driven as a second gate-on voltage ON2 and a second gate-off voltage OFF2.

In one embodiment, in an interval where the first-first EM pulse EM11 is at the first gate-on voltage ON1, the first-second EM pulse EM12 may be at the second gate-off voltage OFF2. In an interval where the first-second EM pulse EM12 is at the second gate-on voltage ON2, the first-first EM pulse EM11 may be at the first gate-off voltage OFF1.

In one embodiment, in an interval where the first-first EM pulse EM11 is at the gate-off voltage OFF1, the first-second EM pulse EM12 may include an interval at the second gate-on voltage ON2 and an interval at the second gate-off voltage OFF2. In an interval where the first-second EM pulse EM12 is at the second gate-off voltage OFF2, the first-first EM pulse EM11 may include an interval at the first gate-on voltage ON1 and an interval at the first gate-off voltage OFF1.

For example, the sum of the time in which the first-first EM pulse EM11 is driven as the first gate-on voltage ON1 and the time in which the first-second EM pulse EM12 is driven as the second gate-on voltage ON2 during one cycle T may be equal to the time in which the first EM pulse EM1 is driven as the gate-on voltage ON during the cycle T.

For example, the first EM pulse EM1 may have a duty ratio of 100 k %. k may be any real number greater than or equal to 0 and less than or equal to 1.

The duty ratios of the first-first EM pulse EM11 and the first-second EM pulse EM12 may be 100 k/2%.

In one embodiment, the time kT/2 in which the second gate-on voltage ON2 of the first-second EM pulse EM12 is applied may overlap the time (1−k/2)T in which the first gate-off voltage OFF1 is applied. For example, the times (1−k)T/2 in which the time kT/2 in which the second gate-on voltage ON2 is applied is excluded from the time (1−k/2)T in which the first gate-off voltage OFF1 is applied may be equal to each other, but embodiments of the present specification are not limited thereto.

For example, k may be 0.8. The first EM pulse EM1 has a duty ratio of 80%. The duty ratios of the first-first EM pulse EM11 and the first-second EM pulse EM12 is 40%. The time in which the first gate-off voltage OFF1 is applied is 0.6T. The time in which the second gate-on voltage ON2 is applied is equal to the time in which the first gate-on voltage ON1 is applied, which is 0.4 T each. As shown, excluding the time in which the second gate-on voltage ON2 is applied, which is 0.4T, from the time in which the first gate-off voltage OFF1 is applied, the time in which the first gate-off voltage OFF1 is applied is 0.2T in total, which is equal to the time in which the gate-off voltage OFF is applied in the first EM pulse EM1, which is 0.2T. When the time 0.2T in which the first gate-off voltage OFF1 is applied, obtained by excluding the time 0.4T in which the second gate-on voltage ON2 is applied, is evenly distributed within the time T, each is 0.1T. However, this is not limited thereto and may not be evenly distributed.

In the embodiment of the present specification, if the sum of the time in which the first-first EM pulse EM11 is driven as the first gate-on voltage ON1 and the time in which the first-second EM pulse EM12 is driven as the second gate-on voltage ON2 is made equal to the time in which the first EM pulse EM1 is driven as the gate-on voltage ON within the period T, the ratio driven as the gate-on voltages ON1 and ON2 in an entirety of the emission phase EMIS may be substantially the same as the duty ratio in the first EM pulse EM1.

Consequently, the variation in the number of gate-off voltages may be reduced without changing the luminance of the pixel, and a display apparatus with an improved mura may be provided.

Figure 30:
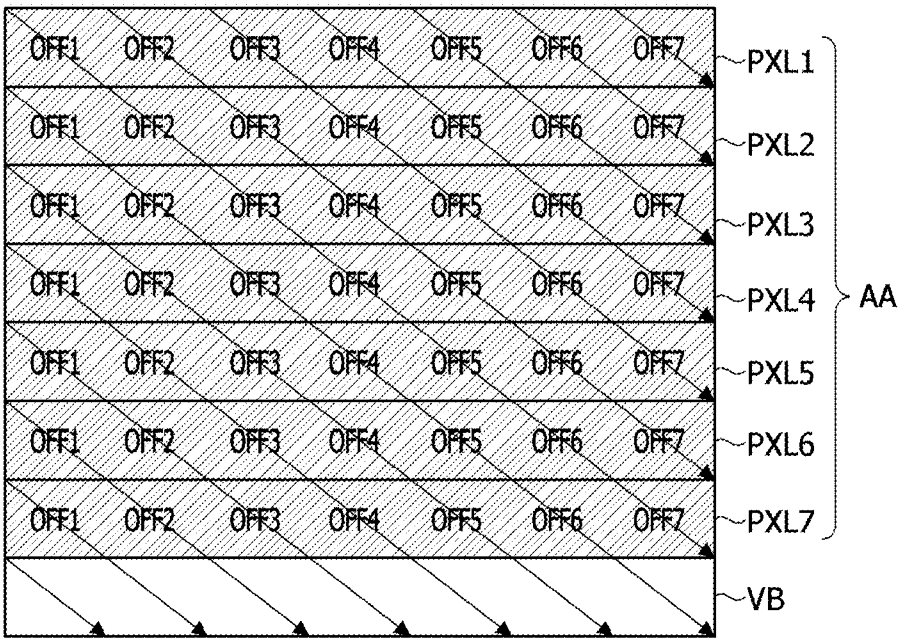
FIG. 30 is a diagram for explaining a display apparatus with an improved mura.
Figure 31:
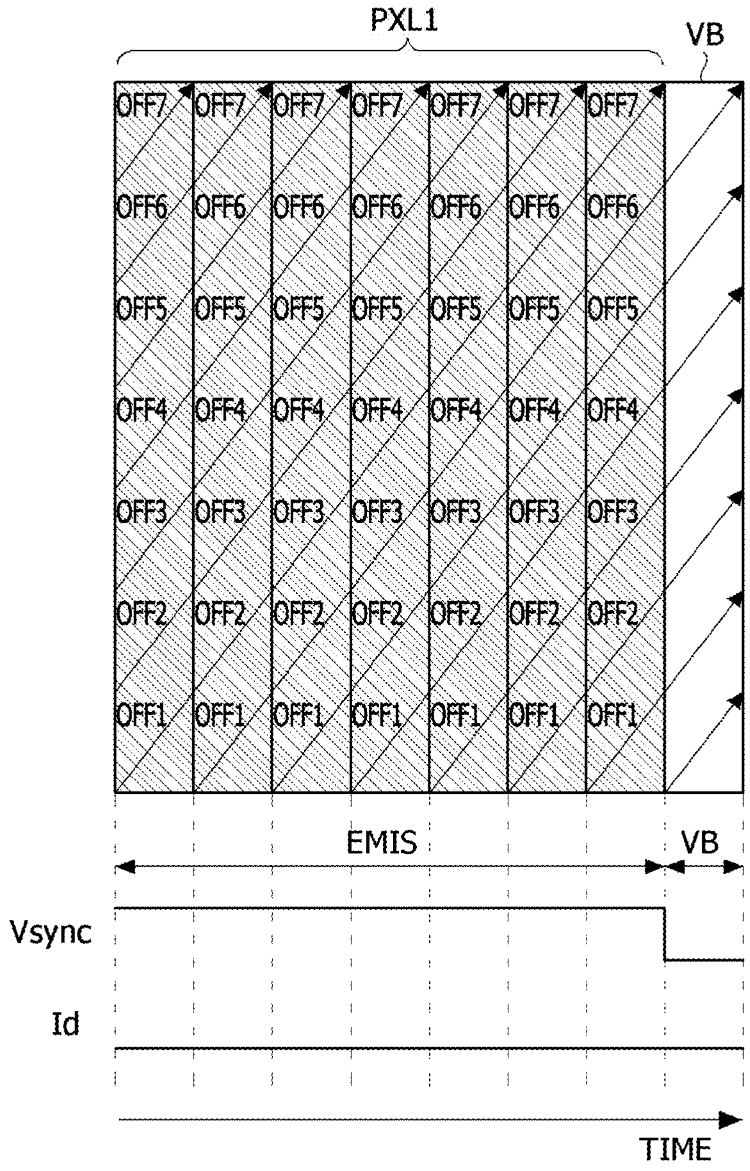
FIG. 31 is a diagram illustrating a driving current of one pixel line over time.
Figure 32:
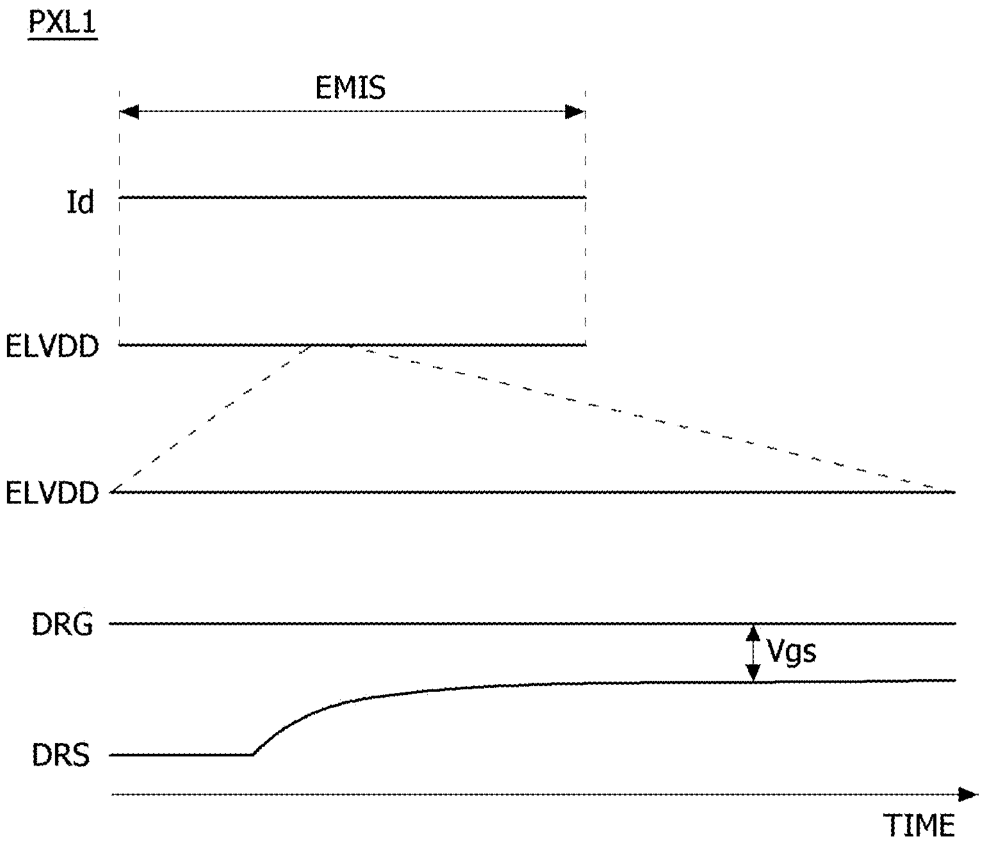
FIG. 32 is a diagram illustrating changes in a pixel driving voltage and a gate-source voltage over time.

FIG. 30 is a diagram for explaining a display apparatus with an improved mura. FIG. 31 is a diagram illustrating a driving current of one pixel line over time. FIG. 32 is a diagram illustrating changes in a pixel driving voltage and a gate-source voltage over time.

Referring to FIG. 30, the display apparatus may include a display area AA. For the sake of illustration, it is assumed that the display area AA according to the embodiment of the present specification includes a first pixel line to a seventh pixel line PXL1 to PXL7. However, embodiments of the present specification are not limited thereto, and the number of pixel lines is not limited, as described below. A symbol "VB" refers to the vertical blank interval on the time axis, which is shown for better understanding.

The display area AA may include a first to seventh pixel line PXL1 to PXL7 to which seven gate-off voltages OFF1, OFF2, OFF3, OFF4, OFF5, OFF6 and OFF7 are applied.

The display area AA may include the first to seventh pixel lines PXL1 to PXL7 to which seven gate-off voltages OFF1 to OFF7 are applied during the emission phase.

For example, within any one frame interval, the seven gate-off voltages OFF1 to OFF7 may be applied to the first to seventh pixel lines PXL1 to PXL7.

There may be no difference in the number of gate-off voltages OFF of "the first EM pulses EM1 applied during the emission phase within any one frame interval" among the plurality of pixel lines PXL1 to PXL7 arranged in the scan direction.

For example, as the first and second emission phases are repeated, the number of gate-off voltages OFF1, OFF3, OFF5, and OFF7 in the first-first EM pulse may be four, and the number of gate-off voltages OFF2, OFF4, and OFF6 in the first-second EM pulse may be three. Alternatively, the number of gate-off voltages OFF2, OFF4, and OFF6 in the first-first EM pulse may be three, and the number of gate-off voltages OFF1, OFF3, OFF5, and OFF7 in the first-second EM pulse may be four. However, it is not limited thereto.

With the formation of the fourth-first switch element and the fourth-second switch element, there may be no difference in the number of gate-off voltages OFF1 to OFF7 from the perspective of connecting or blocking the current path between the VDD line and the first node.

Referring to FIG. 31, there may be no variation in the driving current Id among the plurality of pixel lines PXL1 to PXL7.

Referring to FIG. 32, the driving current Id may be constant and not change over time. Also, the pixel driving voltage ELVDD does not change and the gate-source voltage may not change.

Figure 33:
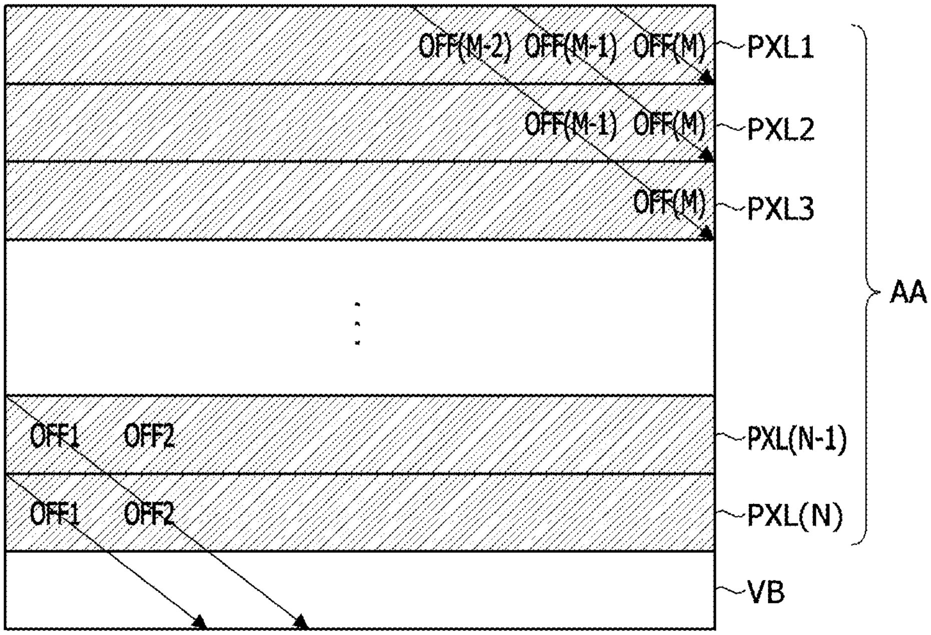
FIG. 33 is a diagram for explaining a relationship between the number of pixel lines and the number of turn-off times of a first EM pulse.
Figure 34:
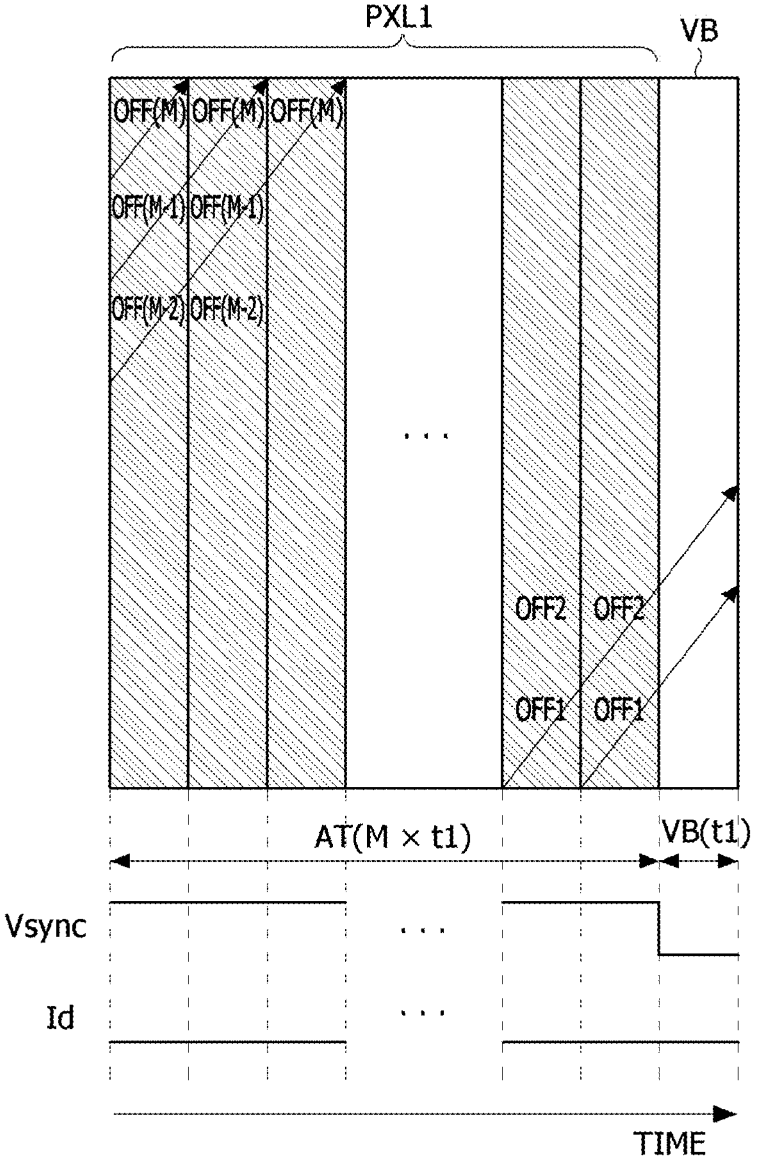
FIG. 34 is a diagram illustrating a driving current of one pixel line over time.

FIG. 33 is a diagram for explaining a relationship between the number of pixel lines and the number of turn-off times of a first EM pulse. FIG. 34 is a diagram illustrating a driving current of one pixel line over time.

Referring to FIG. 33, the display apparatus may include the display area AA. The display area AA may include a first to an (N)th pixel line PXL1, PXL2, . . . , PXL(N−1), and PXL(N).

When the pixel circuit according to an embodiment of the present specification is applied, M gate-off voltages OFF1, OFF2, . . . , and OFF(M) may be applied to each pixel line driven by PWM in the emission phase.

Referring to FIGS. 33 and 34, the time t1 corresponding to the vertical blank VB may be proportional to a value obtained by dividing N pixel lines by M. N may be set to a multiple of M, but embodiments of the present specification are not limited thereto. In a preferred embodiment, both N and M may be integers. In this case, the M gate-off voltages OFF1, OFF2, . . . , OFF(M−1), and OFF(M) may be applied to the first pixel line PXL1 for a time obtained by multiplying the time t1 corresponding to the vertical blank VB by M.

For example, N may be 2660. The display apparatus may have a vertical resolution of 2660. Preferably, M may be set to 7. However, it is not limited to this, and M may also be 8. If M is 7, then the time t1 corresponding to the vertical blank VB may be proportional to 380, which is 2660 divided by 7. For example, the time required to scan the 2660 pixel lines may be proportional to 2660.

For example, if the time required to drive one pixel line is 'a,' then the time AT required to drive the 2660 pixel lines may be 2660a. The time required for driving may be set by considering of the fact that the driving of each pixel line overlap each other (see FIG. 15 and FIG. 19).

If M is 7, the time t1 corresponding to the vertical blank VB may be proportional to 380a, which is 2660a divided by 7.

For example, N may be 2640. The display apparatus may have a vertical resolution of 2640. Preferably, M may be set to 8. If M is 8, then the time t1 corresponding to the vertical blank VB may be proportional to 380, which is 2640 divided by 8. For example, the time required to scan the 2640 pixel lines may be proportional to 2640.

For example, if the time required to drive one pixel line is 'a,' then the time AT required to drive the 2640 pixel lines may be 2640a. If M is 8, the time t1 corresponding to the vertical blank VB may be proportional to 380a, which is 2640a divided by 8.

When the pixel circuit according to the embodiment of the present specification is applied, the number M of the gate-off voltages OFF1, OFF2, . . . , OFF(M−1), and OFF(M) to be applied to each pixel line during the emission phase may be set in consideration of the N pixel lines.

During the emission phase, substantially the same number M of the gate-off voltages are applied to all pixel lines, and the driving current Id may be substantially constant. As a result, the changes in the pixel driving voltages to be supplied during the sampling phase may be avoided, providing the display apparatus with improved mura.

Figure 35:
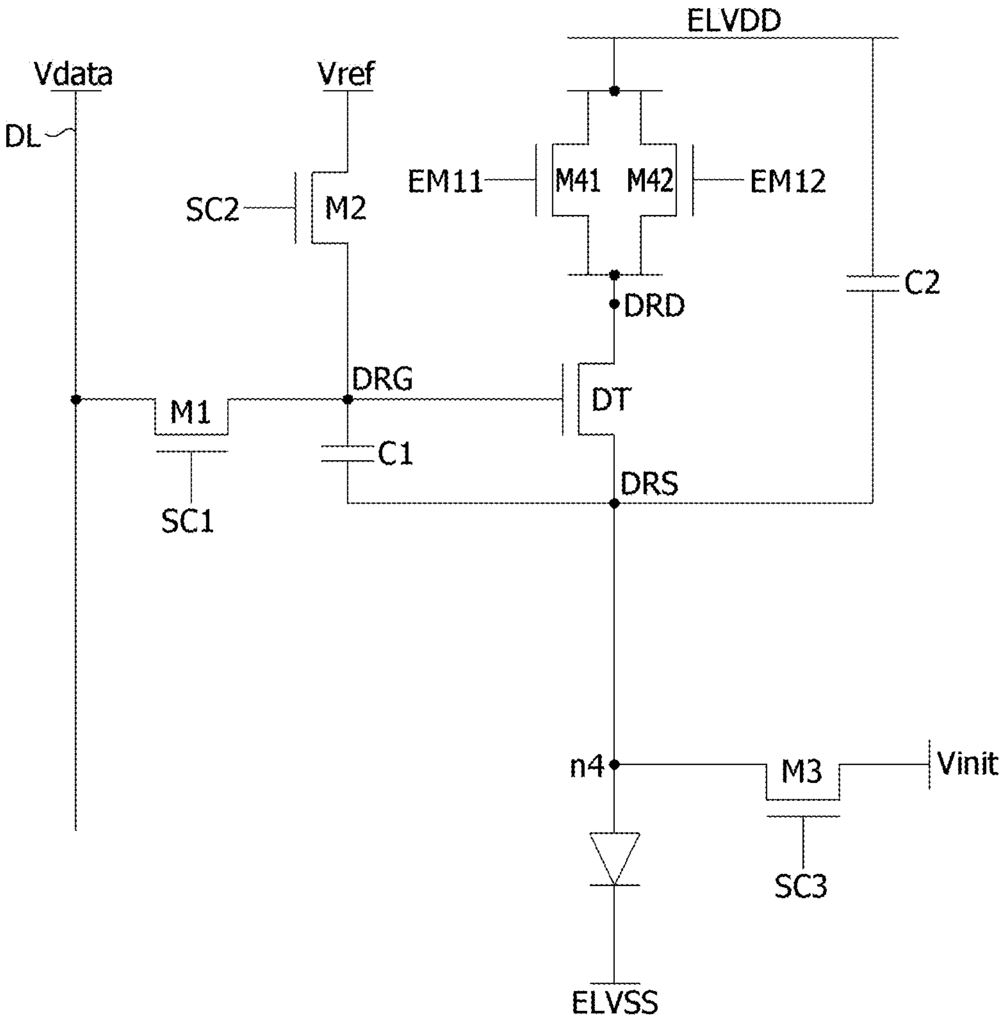
FIG. 35 is a circuit diagram illustrating a pixel circuit according to a second embodiment of the present specification.
Figure 36:
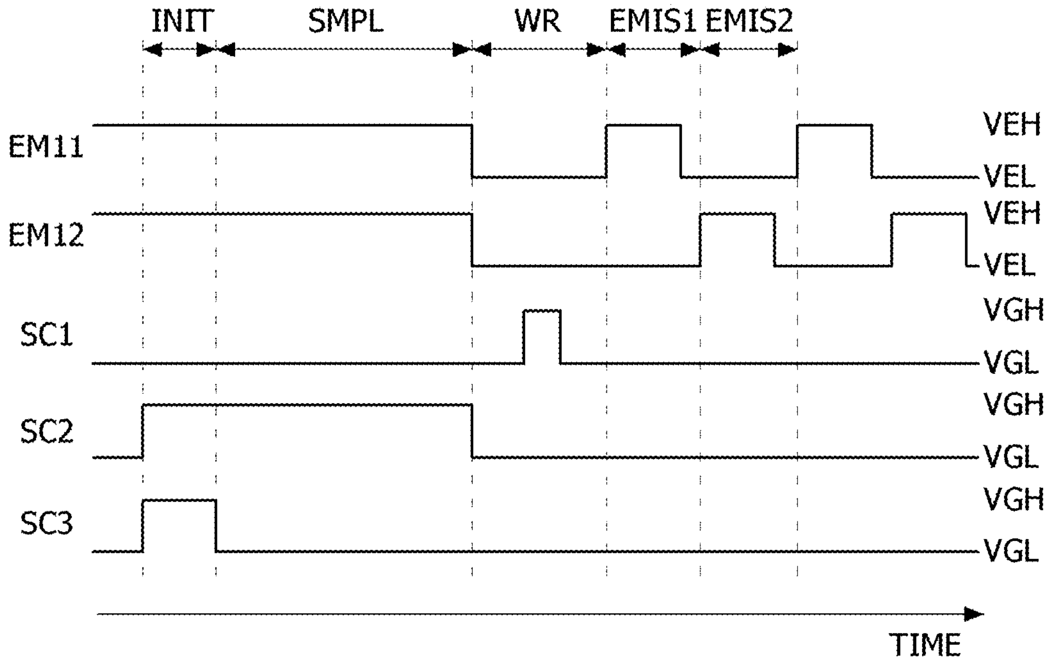
FIG. 36 is a waveform diagram illustrating a method of driving the pixel circuit according to the second embodiment of the present specification.

FIG. 35 is a circuit diagram illustrating a pixel circuit according to a second embodiment of the present specification. FIG. 36 is a waveform diagram illustrating a method of driving the pixel circuit according to the second embodiment of the present specification.

Referring to FIGS. 35 and 36, compared to the first embodiment described above, the fifth switch element arranged between the third node DRS and the fourth node n4 may not be included.

Referring to the driving method of the first embodiment described above, the third scan pulse SC3 was generated as the gate-on voltage VGH in both the sampling phase SMPL and the addressing phase WR, but it did not substantially affect the driving element DT due to the presence of the fifth switch element.

This embodiment differs in that the fifth switch element is not included, but instead, the third scan pulse SC3 may be generated as the gate-off voltage VGL in the sampling stage SMPL and addressing stage WR.

Figure 37:
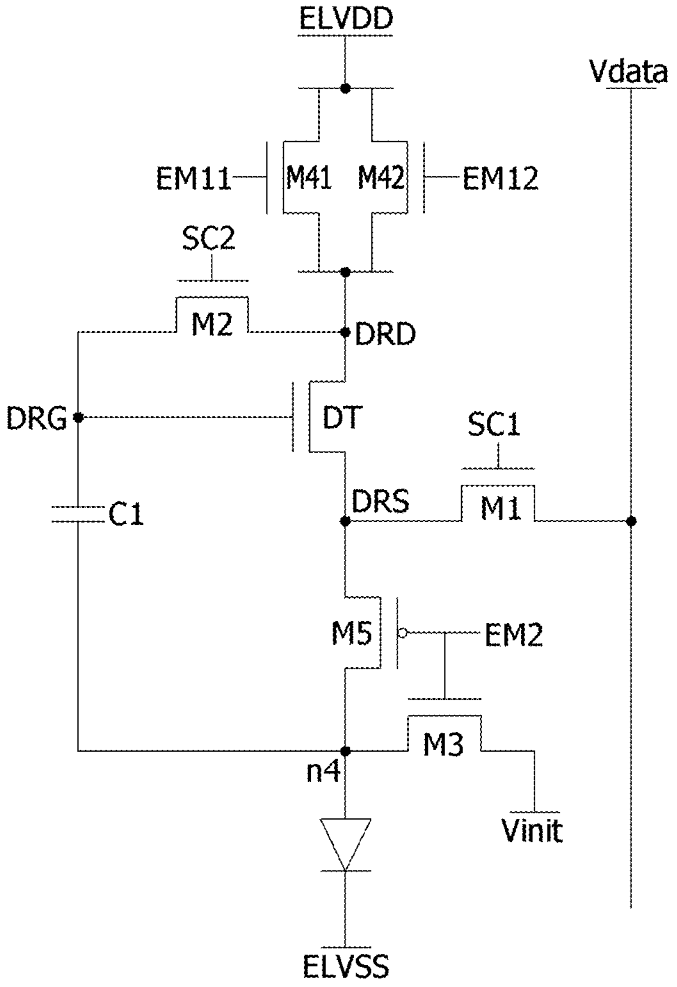
FIG. 37 is a circuit diagram illustrating a pixel circuit according to a third embodiment of the present specification.
Figure 38:
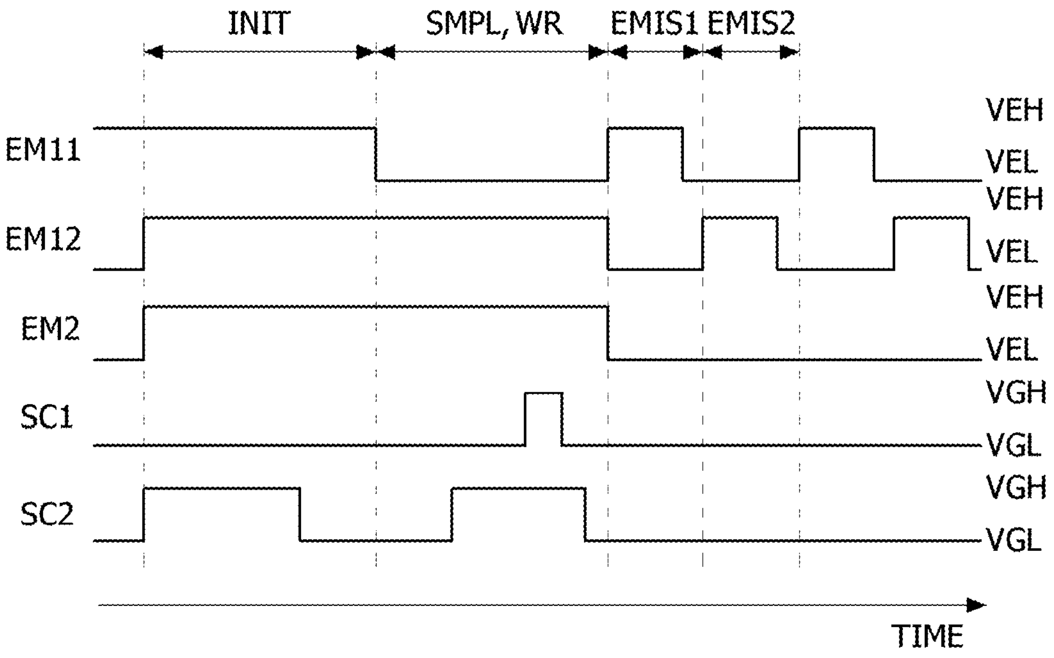
FIG. 38 is a view illustrating a method of driving the pixel circuit according to the third embodiment of the present specification.

FIG. 37 is a circuit diagram illustrating a pixel circuit according to a third embodiment of the present specification. FIG. 38 is a view illustrating a method of driving the pixel circuit according to the third embodiment of the present specification.

Referring to FIGS. 37 and 38, this embodiment may be a pixel circuit implemented in the form of a diode connection.

A first switch element M1 may be turned on according to the gate-on voltage VGH of the first scan pulse SC1 to supply the data voltage Vdata to a third node DRS in the sampling/addressing stages SMPL/WR. The first switch element M1 may include a gate electrode connected to a first gate line to which the first scan pulse SC1 is applied, a first electrode connected to the third node DRS, and a second electrode connected to a data line DL to which the data voltage Vdata is applied.

A second switch element M2 may be turned on according to the gate-on voltage VGH of the second scan pulse SC2 to connect its first electrode and the gate electrode of the first driving element DT1 in the initialization phase INIT and the sampling/addressing phases SMPL/WR. The second switch element M2 may include a gate electrode connected to a second gate line to which the second scan pulse SC21 is applied, the first electrode connected to the second node DRG, and a second electrode connected to the first node DRD.

A first capacitor C1 may be connected between the second node DRG and a fourth node n4.

The second EM pulse EM2 may be generated as the gate high voltage VEH during the initialization phase INIT, sampling/addressing phase SMPL/WR. The second EM pulse EM2 may be generated at the gate low voltage VEL during the emission phases EMIS1 and EMIS2.

In one embodiment, a fifth switch element M5 may be implemented as a p-channel transistor and a third switch element M3 may be implemented as an n-channel transistor.

When the second EM pulse EM2 is generated as the gate high voltage VEH, the fifth switch element M5 may be turned off and the third switch element M3 may be turned on. When the second EM pulse EM2 is generated as the gate low voltage VEL, the fifth switch element M5 may be turned on and the third switch element M3 may be turned off.

The third switch element M3 may be turned on according to the gate high voltage VEH of the second EM pulse EM2 to apply the initialization voltage Vinit to the fourth node n4 during the initialization phase INIT, the sampling/addressing phases SMPL/WR. The third switch element M3 may include a gate electrode connected to a fifth gate line to which the second EM pulse EM2 is applied, a first electrode connected to the fourth node n4, and a second electrode connected to an INIT line to which the initialization voltage Vinit is applied.

The fifth switch element M5 may be turned off according to the gate high voltage VEH of the second EM pulse EM2 to block the current past between the third node DRS and the fourth node n4 during the initialization phase INIT, the sampling/addressing phase SMPL/WR. The fifth switch element M5 may be turned on according to the gate low voltage VEL of the second EM pulse EM2 to form the current past between the drive element DT and the light-emitting element EL during the emission phases EMIS1 and EMIS2. The fifth switch element M5 may include a gate electrode connected to the fifth gate line to which the second EM pulse EM2 is applied, a first electrode connected to the third node DRS, and a second electrode connected to the fourth node n4.

Although the embodiments of the present specification have been described in more detail with reference to the accompanying drawings, the present specification is not necessarily limited to such embodiments, and may be variously modified within the scope thereof without departing from the technical spirit of the present specification.

Accordingly, the embodiments disclosed herein are provided for illustrative purposes and are not intended to limit the technical concept of the present specification, and the scope of the technical concept of the present specification is not limited to these embodiments.

Therefore, it should be understood that the embodiments described above are illustrative in all aspects and are not intended to be limiting.

The scope of protection of the present specification should be construed on the basis of the following claims, and all technical concepts within the equivalent scope thereof should be construed as falling within the scope of the present specification.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a first node connected to a VDD line to which a first constant voltage is configured to be applied;

a third node connected to a fourth node connected to a light-emitting element;

a fourth-first switch element arranged between the VDD line and the first node; and a fourth-second switch element arranged between the VDD line and the first node, wherein an initialization phase, a sampling phase, an addressing phase, and an emission phase are configured to be repeatedly performed during a driving step, and wherein the fourth-first switch element and the fourth-second switch element are configured to be PWM-driven in the emission phase.

2. The pixel circuit of claim 1, wherein the emission phase includes:

a first emission phase in which a first-first EM pulse including a gate-on voltage and a first-second EM pulse including only a gate-off voltage are applied, and a second emission phase in which the first-second EM pulse including a gate-on voltage and the first-first EM pulse including only a gate-off voltage are applied.

3. The pixel circuit of claim 2, wherein the first-first EM pulse is configured to be applied to a gate electrode of the fourth-first switch element, and the first-second EM pulse is configured to be applied to a gate electrode of the fourth-second switch element.

4. The pixel circuit of claim 2, wherein the emission phase is performed by alternately repeating the first emission phase and the second emission phase.

5. The pixel circuit of claim 2, wherein the fourth-first switch element includes a gate electrode connected to receive the first-first EM pulse, a first electrode connected to the VDD line, and a second electrode connected to the first node, and the fourth-second switch element includes a gate electrode connected to receive the first-second EM pulse, a first electrode connected to the VDD line, and a second electrode connected to the first node.

6. The pixel circuit of claim 5, wherein the emission phase is performed by alternately repeating a first emission phase and a second emission phase, and the first-first EM pulse includes a gate-on voltage and a gate-off voltage in the first emission phase, and includes a gate-off voltage in the second emission phase.

7. The pixel circuit of claim 5, wherein the emission phase is performed by alternately repeating the first emission phase and the second emission phase, and the first-second EM pulse includes a gate-off voltage in the first emission phase and includes a gate-on voltage and a gate-off voltage in the second emission phase.

8. The pixel circuit of claim 5, wherein:

in an interval in which the first-first EM pulse is at a gate-on voltage, the first-second EM pulse is at a gate-off voltage, and in an interval in which the first-second EM pulse is at a gate-on voltage, the first-first EM pulse is at a gate-off voltage.

9. The pixel circuit of claim 5, wherein:

in an interval in which the first-first EM pulse is at a gate-off voltage, the first-second EM pulse includes an interval which is at a gate-on voltage and an interval which is at a gate-off voltage, and in an interval in which the first-second EM pulse is at a gate-off voltage, the first-first EM pulse includes an interval which is at a gate-on voltage and an interval which is at a gate-off voltage.

10. The pixel circuit of claim 1, wherein the first constant voltage is a pixel driving voltage.

11. A display apparatus comprising:

a display panel in which a plurality of data lines, a plurality of gate lines intersecting the data lines, a plurality of power lines, and a plurality of pixel circuits connected to the data lines, the gate lines, and the power lines are arranged;

a data driver configured to supply a data voltage of pixel data to the data lines; and a gate driver configured to supply a gate signal to the gate lines, wherein each of the plurality of pixel circuits includes:

a first node connected to a VDD line to which a first constant voltage is configured to be applied;

a third node connected to a fourth node connected to a light-emitting element;

a fourth-first switch element arranged between the VDD line and the first node; and a fourth-second switch element arranged between the VDD line and the first node, and wherein the pixel circuit is configured to repeatedly performs an initialization phase, a sampling phase, an addressing phase, and an emission phase in a driving step, and the fourth-first switch element and the fourth-second switch element are configured to be PWM-driven in the emission phase.

12. The display apparatus of claim 11, wherein:

the display panel includes a plurality of pixel lines, each of the plurality of pixel lines includes a plurality of pixels, each of the plurality of pixels includes the pixel circuit, and each of the plurality of pixel lines shares one gate line of the gate lines.

13. The display apparatus of claim 12, wherein during the driving phase, an emission phase is performed on one pixel line among the plurality of pixel lines, and a sampling phase is performed on another pixel line among the plurality of pixel lines.

14. The display apparatus of claim 11, wherein each of the plurality of pixel circuits further includes:

a driving element including a gate electrode connected to a second node, a first electrode connected to the first node, and a second electrode connected to the third node.

15. The display apparatus of claim 14, wherein each of the plurality of pixel circuits further includes:

a third switch element including a gate electrode, a first electrode connected to the fourth node, and a second electrode to which a third constant voltage is configured to be applied.

16. The display apparatus of claim 15, wherein each of the plurality of pixel circuits further includes:

a first switch element including a gate electrode connected to a first gate line to which the first scan pulse is configured to be applied, a first electrode connected to a data line to which a data voltage is configured to be applied, and a second electrode connected to the second node; and a second switch element including a gate electrode connected to a second gate line to which a second scan pulse is configured to be applied, a first electrode connected to a REF line to which a second constant voltage is configured to be applied, and a second electrode connected to the second node.

17. The display apparatus of claim 16, wherein each of the plurality of pixel circuits further includes:

a second capacitor connected between the third node and the VDD line.

18. The display apparatus of claim 16, wherein each of the plurality of pixel circuits further includes:

a fifth switch element including a gate electrode connected to a fifth gate line to which a second EM pulse is configured to be applied, a first electrode connected to the third node, and a second electrode connected to the fourth node, wherein the gate electrode of the third switch element is connected to a third gate line to which a third scan pulse is configured to be applied.

19. The display apparatus of claim 15, wherein each of the plurality of pixel circuits further includes:

a first switch element including a gate electrode connected to a first gate line to which a first scan pulse is configured to be applied, a first electrode connected to the third node, and a second electrode connected to a data line to which a data voltage is configured to be applied; and a second switch element including a gate electrode connected to a second gate line to which a second scan pulse is configured to be applied, a first electrode connected to the second node, and a second electrode connected to the first node.

20. The display apparatus of claim 19, wherein each of the plurality of pixel circuits further includes:

a fifth switch element including a gate electrode connected to a fifth gate line to which a second EM pulse is configured to be applied, a first electrode connected to the third node, and a second electrode connected to the fourth node, and wherein a gate electrode of the third switch element is connected to the fifth gate line.

* * * * *